US012651560B2

(12) United States Patent
Kim et al.

(10) Patent No.: US 12,651,560 B2
(45) Date of Patent: Jun. 9, 2026

(54) DISPLAY DEVICE

(71) Applicant: Samsung Display Co., Ltd., Yongin-Si (KR)

(72) Inventors: Sung Hwan Kim, Yongin-si (KR); Hyeon Jun Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/056,747

(22) Filed: Feb. 19, 2025

(65) Prior Publication Data

US 2025/0391322 A1 Dec. 25, 2025

(30) Foreign Application Priority Data

Jun. 21, 2024 (KR) ........................ 10-2024-0080783

(51) Int. Cl.
*G09G 3/3241* (2016.01)
*G09G 3/32* (2016.01)

(52) U.S. Cl.
CPC ....... *G09G 3/32* (2013.01); *G09G 2300/0426* (2013.01); *G09G 2300/0819* (2013.01)

(58) Field of Classification Search
CPC ............. G09G 3/32; G09G 2300/0426; G09G 2300/0819; G09G 3/3233; H01L 25/0753
See application file for complete search history.

(56) References Cited

U.S. PATENT DOCUMENTS

| | | | |
|---|---|---|---|
| 10,943,967 B2 | 3/2021 | Kim et al. | |
| 11,545,537 B2 | 1/2023 | Lee et al. | |
| 12,213,363 B2 | 1/2025 | Wang et al. | |
| 2022/0415987 A1 | 12/2022 | Choi et al. | |
| 2023/0317908 A1 | 10/2023 | Park et al. | |
| 2023/0363206 A1 | 11/2023 | Kim et al. | |
| 2024/0119889 A1* | 4/2024 | Choi | H01L 25/0753 |
| 2024/0371325 A1* | 11/2024 | Gu | G09G 3/3233 |

FOREIGN PATENT DOCUMENTS

| | | | |
|---|---|---|---|
| EP | 4303931 A1 | 1/2024 | |
| KR | 10-2021-0155444 A | 12/2021 | |
| KR | 10-2023-0000508 A | 1/2023 | |
| KR | 10-2511048 B1 | 3/2023 | |
| KR | 10-2023-0119738 A | 8/2023 | |
| KR | 10-2023-0140634 A | 10/2023 | |
| KR | 10-2023-0157577 A | 11/2023 | |

* cited by examiner

*Primary Examiner* — Abdul-Samad A Adediran
(74) *Attorney, Agent, or Firm* — Innovation Counsel LLP

(57) ABSTRACT

There is provided a display device comprises a substrate comprising a display area in which emission areas; a circuit layer; and an element layer comprising light emitting elements disposed in the emission areas. The circuit layer comprises light emitting pixel drivers electrically connected to the light emitting elements and arranged in a plurality of pixel columns and a plurality of pixel rows; and a first power line transmitting a first power to the light emitting pixel drivers. The first power line comprises power auxiliary lines extending in one direction; and mesh auxiliary electrodes electrically connected to the power auxiliary lines. Among the power auxiliary lines, two power auxiliary lines neighboring each other are electrically connected to each other through mesh auxiliary electrodes disposed between the two power auxiliary lines and parallel to each other in the one direction, among the mesh auxiliary electrodes.

20 Claims, 20 Drawing Sheets

DISPLAY DEVICE

CROSS-REFERENCE TO RELATED APPLICATION

This application claims priority from Korean Patent Application No. 10-2024-0080783 filed on Jun. 21, 2024 in the Korean Intellectual Property Office, and all the benefits accruing therefrom under 35 U.S.C. 119, the contents of which in its entirety are incorporated herein by reference.

BACKGROUND

1. Technical Field

The present disclosure relates to a display device.

2. Description of the Related Art

With the advance of information-oriented society, more and more demands are placed on display devices for displaying images in various ways. For example, display devices are employed in various electronic devices such as smartphones, digital cameras, laptop computers, navigation devices, and smart televisions.

The display device may be a flat panel display device such as a liquid crystal display device, a field emission display device and a light emitting display device. Examples of the light emitting display device may include an organic light emitting display device including organic light emitting elements, an inorganic light emitting display device including inorganic light emitting elements such as inorganic semiconductors, and a micro light emitting display device including micro light emitting elements.

The organic light emitting display device displays an image using light emitting elements, each including a light emitting layer made of an organic light emitting material. As described above, the organic light emitting display device implements image display using a self-light emitting element, and thus may have relatively superior performance in power consumption, response speed, luminous efficiency, luminance, and wide viewing angle compared to other display devices.

One surface of the display device may be a display surface including a display area in which an image is displayed and a non-display area that is a periphery of the display area. Emission areas emitting light with respective luminances and colors may be arranged in the display area.

SUMMARY

The display device may include light emitting elements respectively disposed in emission areas, light emitting pixel drivers that transmit driving currents of the light emitting elements, and wires that transmit power or constant voltage to the light emitting pixel drivers.

As the display device becomes larger in area or higher in resolution, the resistance of the wires increases, which may cause power or constant voltage to be delayed or distorted. Accordingly, in order to reduce delay or distortion of the power or constant voltage, at least some of the power or at least some of the constant voltage may be transmitted to the light emitting pixel drivers through mesh-shaped wiring extending in intersecting directions.

In this case, the mesh-shaped wiring is disposed over a wider width than the wiring extending in one direction, and thus there may be a limit to the integration of the light emitting pixel drivers. As a result, there may be a limit to the high resolution of the display device.

In view of the above, aspects of the present disclosure provide a display device that includes mesh-shaped wiring while still being advantageous for high resolution.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a display device comprises a substrate comprising a display area in which emission areas are arranged; a circuit layer disposed on the substrate; and an element layer disposed on the circuit layer and comprising light emitting elements disposed in the emission areas. The circuit layer comprises light emitting pixel drivers electrically connected to the light emitting elements and arranged in a plurality of pixel columns and a plurality of pixel rows; and a first power line transmitting a first power to the light emitting pixel drivers. The first power line comprises power auxiliary lines extending in one direction; and mesh auxiliary electrodes electrically connected to the power auxiliary lines. Among the power auxiliary lines, two power auxiliary lines neighboring each other are electrically connected to each other through mesh auxiliary electrodes disposed between the two power auxiliary lines and parallel to each other in the one direction, among the mesh auxiliary electrodes.

Each of the plurality of pixel columns comprises light emitting pixel drivers arranged in a first direction. Each of the plurality of pixel rows comprises light emitting pixel drivers arranged in a second direction, the one direction being the second direction. The power auxiliary lines extend in the second direction. One of the power auxiliary lines comprises main portions overlapping a boundary between two pixel rows neighboring each other in the first direction among the plurality of pixel rows and arranged in the second direction; a first connection portion facing the boundary between the two pixel rows on one side of the first direction, extending in the second direction, and connected between two neighboring main portions among the main portions; and a second connection portion facing the boundary between the two pixel rows on an other side of the first direction, extending in the second direction, and connected between two other neighboring main portions among the main portions. The first connection portions and the second connection portions are arranged alternately at least one by one in the second direction.

The power auxiliary lines comprise a first power auxiliary line, a second power auxiliary line, and a third power auxiliary line neighboring each other in the first direction. A first connection portion of the first power auxiliary line faces a second connection portion of the second power auxiliary line. A first connection portion of the second power auxiliary line faces a second connection portion of the third power auxiliary line.

Each of the mesh auxiliary electrodes disposed between the two power auxiliary lines is electrically connected to a first connection portion of one of the two power auxiliary lines, and is electrically connected to a second connection portion of an other of the two power auxiliary lines.

One of the light emitting pixel drivers comprises a first transistor electrically connected between a first node and a second node; a pixel capacitor electrically connected between the first power line and a third node; a second transistor electrically connected between a data line transmitting a data signal and the first node; a third transistor electrically connected between the second node and the third node; a fourth transistor electrically connected between a gate initialization voltage line transmitting a gate initialization voltage and the third node; a fifth transistor electrically connected between the first power line and the first node; a sixth transistor electrically connected between the second node and the fourth node; a seventh transistor electrically connected between an anode initialization voltage line transmitting an anode initialization voltage and the fourth node; and an eighth transistor electrically connected between a bias voltage line transmitting a bias voltage and the first node. The first node is electrically connected to a first electrode of the first transistor. The second node is electrically connected to a second electrode of the first transistor. The third node is electrically connected to a gate electrode of the first transistor. The fourth node is electrically connected to one of the light emitting elements.

The circuit layer comprises a first semiconductor layer disposed on the substrate; a first gate insulating layer covering the first semiconductor layer; a first gate conductive layer disposed on the first gate insulating layer; a second gate insulating layer covering the first gate conductive layer; a second gate conductive layer disposed on the second gate insulating layer; a first interlayer insulating layer covering the second gate conductive layer; a second semiconductor layer disposed on the first interlayer insulating layer; a third gate insulating layer covering the second semiconductor layer; a third gate conductive layer disposed on the third gate insulating layer; a second interlayer insulating layer covering the third gate conductive layer; a first source-drain conductive layer disposed on the second interlayer insulating layer; a first planarization layer covering the first source-drain conductive layer; a second source-drain conductive layer disposed on the first planarization layer; and a second planarization layer covering the second source-drain conductive layer. The first semiconductor layer comprises a channel portion, a first electrode portion, and a second electrode portion of each of the first transistor, the second transistor, the fifth transistor, the sixth transistor, the seventh transistor, and the eighth transistor. The first gate conductive layer comprises the gate electrode of the first transistor. The second semiconductor layer comprises a channel portion, a first electrode portion, and a second electrode portion of each of the third transistor and the fourth transistor.

The circuit layer further comprises shielding auxiliary electrodes disposed between the power auxiliary lines and arranged alternately with the mesh auxiliary electrodes in the first direction and the second direction. Each of the light emitting pixel drivers further comprises a capacitor electrode disposed in the second gate conductive layer and overlapping the gate electrode of the first transistor. In each of the light emitting pixel drivers, each of the capacitor electrode and the first electrode portion of the fifth transistor is electrically connected to one of the mesh auxiliary electrodes and the shielding auxiliary electrodes.

The substrate further comprises a non-display area disposed around the display area. The circuit layer further comprises data lines extending in the second direction and transmitting a data signal to the light emitting pixel drivers; data supply lines disposed in the non-display area and electrically connected between a display driving circuit supplying the data signal and the data lines; first auxiliary lines extending in the first direction; and second auxiliary lines extending in the second direction and neighboring the data lines, respectively. A bypass area on one side of the display area comprises a bypass middle area, a first bypass side area parallel to the bypass middle area in the first direction and in contact with the non-display area, and a second bypass side area disposed between the bypass middle area and the first bypass side area. The first auxiliary lines comprise a first bypass auxiliary line electrically connected to a first data line adjacent to the non-display area in the first direction among the data lines, and first transmission auxiliary lines other than the first bypass auxiliary line. The second auxiliary lines comprise a second bypass auxiliary line electrically connected to the first bypass auxiliary line and neighboring a second data line spaced further apart from the non-display area in the first direction than the first data line among the data lines, and second transmission auxiliary lines other than the second bypass auxiliary line. The data supply lines extend to the bypass middle area and the second bypass side area. Among the data supply lines, a first data supply line transmitting a data signal of the first data line is electrically connected to the first data line through the first bypass auxiliary line and the second bypass auxiliary line. Among the data supply lines, a second data supply line transmitting a data signal of the second data line is directly electrically connected to the second data line.

Among the second auxiliary lines, two second auxiliary lines are disposed between the two power auxiliary lines. Among the data lines, two data lines are disposed between the two second auxiliary lines. The mesh auxiliary electrodes and the shielding auxiliary electrodes arranged alternately between the two power auxiliary lines overlap the two data lines and the two second auxiliary lines.

Capacitor electrodes of two light emitting pixel drivers neighboring each other in the first direction among the light emitting pixel drivers are in contact with each other at a boundary between the two light emitting pixel drivers and overlap one of the mesh auxiliary electrodes and the shielding auxiliary electrodes. Capacitor electrodes of two other light emitting pixel drivers neighboring each other in the first direction among the light emitting pixel drivers are connected to each other through a bypass extension portion extending in the first direction. The capacitor electrode of one of the two other light emitting pixel drivers overlaps one of the mesh auxiliary electrodes. The capacitor electrode of an other of the two other light emitting pixel drivers overlaps one of the shielding auxiliary electrodes.

The second source-drain conductive layer comprises the power auxiliary lines. The first source-drain conductive layer comprises the mesh auxiliary electrodes and the shielding auxiliary electrodes. The mesh auxiliary electrodes are electrically connected to the power auxiliary lines through first power connection holes and are electrically connected to the capacitor electrode through a second power connection hole. The shielding auxiliary electrodes are electrically connected to the capacitor electrode through a third power connection hole. The first electrode portion of the fifth transistor is electrically connected to one of the mesh auxiliary electrodes and the shielding auxiliary electrodes through a fourth power connection hole.

Each of the light emitting pixel drivers further comprises a gate connection electrode electrically connecting the gate electrode of the first transistor to a connection point between the second electrode portion of the third transistor and the second electrode portion of the fourth transistor in the second semiconductor layer. The gate connection electrodes of the light emitting pixel drivers are disposed in the first source-drain conductive layer and are spaced apart from the mesh auxiliary electrodes and the shielding auxiliary electrodes.

The gate connection electrode is electrically connected to the gate electrode of the first transistor through a first gate connection hole penetrating the second interlayer insulating layer, the third gate insulating layer, the first interlayer insulating layer, and the second gate insulating layer. The gate connection electrode is electrically connected to the second electrode portion of the third transistor and the second electrode portion of the fourth transistor through a second gate connection hole penetrating the second interlayer insulating layer and the third gate insulating layer.

According to an aspect of the present disclosure, there is provided a display device comprises a substrate comprising a display area in which emission areas are arranged; a circuit layer disposed on the substrate; and an element layer disposed on the circuit layer and comprising light emitting elements disposed in the emission areas. The circuit layer comprises light emitting pixel drivers electrically connected to the light emitting elements and arranged in a plurality of pixel columns and a plurality of pixel rows; data lines transmitting a data signal to the light emitting pixel drivers; and a first power line transmitting a first power to the light emitting pixel drivers. Each of the light emitting pixel drivers comprises a first transistor electrically connected between a first node and a second node; a second transistor electrically connected between one of the data lines and the first node; a third transistor electrically connected between the second node and the third node; and a fourth transistor electrically connected between a gate initialization voltage line transmitting a gate initialization voltage and the third node. The first node is electrically connected to a first electrode of the first transistor. The second node is electrically connected to a second electrode of the first transistor. The third node is electrically connected to a gate electrode of the first transistor. The first power line comprises power auxiliary lines disposed in the same layer as the data lines and extending in one direction; and mesh auxiliary electrodes electrically connected to the power auxiliary lines. Each of the light emitting pixel drivers further comprises a gate connection electrode electrically connecting the gate electrode of the first transistor to a connection portion between the second electrode portion of the third transistor and the second electrode portion of the fourth transistor in the second semiconductor layer. The gate connection electrodes of the light emitting pixel drivers are disposed in the same layer as the mesh auxiliary electrodes and are spaced apart from the mesh auxiliary electrodes. Among the power auxiliary lines, two power auxiliary lines neighboring each other are electrically connected to each other through mesh auxiliary electrodes disposed between the two power auxiliary lines and parallel to each other in the one direction, among the mesh auxiliary electrodes.

Each of the light emitting pixel drivers further comprises a pixel capacitor electrically connected between the first power line and a third node; a fifth transistor electrically connected between the first power line and the first node; a sixth transistor electrically connected between the second node and the fourth node; a seventh transistor electrically connected between an anode initialization voltage line transmitting an anode initialization voltage and the fourth node; and an eighth transistor electrically connected between a bias voltage line transmitting a bias voltage and the first node. The fourth node is electrically connected to one of the light emitting elements. The circuit layer comprises a first semiconductor layer disposed on the substrate; a first gate insulating layer covering the first semiconductor layer; a first gate conductive layer disposed on the first gate insulating layer; a second gate insulating layer covering the first gate conductive layer; a second gate conductive layer disposed on the second gate insulating layer; a first interlayer insulating layer covering the second gate conductive layer; a second semiconductor layer disposed on the first interlayer insulating layer; a third gate insulating layer covering the second semiconductor layer; a third gate conductive layer disposed on the third gate insulating layer; a second interlayer insulating layer covering the third gate conductive layer; a first source-drain conductive layer disposed on the second interlayer insulating layer; a first planarization layer covering the first source-drain conductive layer; a second source-drain conductive layer disposed on the first planarization layer; and a second planarization layer covering the second source-drain conductive layer. The first semiconductor layer comprises a channel portion, a first electrode portion, and a second electrode portion of each of the first transistor, the second transistor, the fifth transistor, the sixth transistor, the seventh transistor, and the eighth transistor. The first gate conductive layer comprises the gate electrode of the first transistor. The second semiconductor layer comprises a channel portion, a first electrode portion, and a second electrode portion of each of the third transistor and the fourth transistor. The first source-drain conductive layer comprises the mesh auxiliary electrodes and the gate connection electrode. The second source-drain conductive layer comprises the power auxiliary lines.

Each of the plurality of pixel columns comprises light emitting pixel drivers arranged in a first direction. Each of the plurality of pixel rows comprises light emitting pixel drivers arranged in a second direction, the one direction being the second direction. The power auxiliary lines extend in the second direction. One of the power auxiliary lines comprises main portions overlapping a boundary between two pixel rows neighboring each other in the first direction among the plurality of pixel rows and arranged in the second direction; a first connection portion facing the boundary between the two pixel rows on one side of the first direction, extending in the second direction, and connected between two neighboring main portions among the main portions; and a second connection portion facing the boundary between the two pixel rows on an other side of the first direction, extending in the second direction, and connected between two other neighboring main portions among the main portions. The first connection portions and the second connection portions are arranged alternately at least one by one in the second direction. Each of the mesh auxiliary electrodes disposed between the two power auxiliary lines is electrically connected to a first connection portion of one of the two power auxiliary lines, and is electrically connected to a second connection portion of an other of the two power auxiliary lines.

The power auxiliary lines comprise a first power auxiliary line, a second power auxiliary line, and a third power auxiliary line neighboring each other in the first direction. A first connection portion of the first power auxiliary line faces a second connection portion of the second power auxiliary line. A first connection portion of the second power auxiliary line faces a second connection portion of the third power auxiliary line.

The circuit layer further comprises shielding auxiliary electrodes disposed between the power auxiliary lines and arranged alternately with the mesh auxiliary electrodes in the first direction and the second direction. Each of the light emitting pixel drivers further comprises a capacitor electrode disposed in the second gate conductive layer, overlapping the gate electrode of the first transistor, and electrically connected to the first power line. In each of the light emitting pixel drivers, the first electrode portion of the fifth transistor is electrically connected to the capacitor electrode through one of the mesh auxiliary electrodes and the shielding auxiliary electrodes.

The display device further comprises a display driving circuit supplying a data signal to the data lines. The substrate further comprises a non-display area disposed around the display area. The circuit layer further comprises data supply lines disposed in the non-display area and electrically connected between the data lines and the display driving circuit; first auxiliary lines extending in the first direction; and second auxiliary lines extending in the second direction and neighboring the data lines, respectively. A bypass area on one side of the display area comprises a bypass middle area, a first bypass side area parallel to the bypass middle area in the first direction and in contact with the non-display area, and a second bypass side area disposed between the bypass middle area and the first bypass side area. The first auxiliary lines comprise a first bypass auxiliary line electrically connected to a first data line adjacent to the non-display area in the first direction among the data lines, and first transmission auxiliary lines other than the first bypass auxiliary line. The second auxiliary lines comprise a second bypass auxiliary line electrically connected to the first bypass auxiliary line and neighboring a second data line spaced further apart from the non-display area in the first direction than the first data line among the data lines, and second transmission auxiliary lines other than the second bypass auxiliary line. The data supply lines extend to the bypass middle area and the second bypass side area. Among the data supply lines, a first data supply line transmitting a data signal of the first data line is electrically connected to the first data line through the first bypass auxiliary line and the second bypass auxiliary line. Among the data supply lines, a second data supply line transmitting a data signal of the second data line is directly electrically connected to the second data line.

Among the second auxiliary lines, two second auxiliary lines are disposed between the two power auxiliary lines. Among the data lines, two data lines are disposed between the two second auxiliary lines. Among the shielding auxiliary electrodes, shielding auxiliary electrodes disposed between the two power auxiliary lines overlap the two data lines and the two second auxiliary lines.

The display device according to embodiments includes a substrate, a circuit layer, and an element layer.

The element layer may include light emitting elements respectively disposed in the emission areas.

The circuit layer may include light emitting pixel drivers that are electrically connected to the light emitting elements and arranged in a plurality of pixel columns and a plurality of pixel rows, and a first power line that transmits first power to the light emitting pixel drivers.

The first power line may include power auxiliary lines extending in one direction, and mesh auxiliary electrodes electrically connected to the power auxiliary lines. That is, two power auxiliary lines neighboring each other among the power auxiliary lines, may be electrically connected to each other through the mesh auxiliary electrodes disposed between the two power auxiliary lines and parallel to each other in one direction.

In this way, since the neighboring power auxiliary lines are electrically connected to each other by the island-like mesh auxiliary electrodes, even if the first power line does not include a line that intersects the power auxiliary lines, the first power may be transmitted to the light emitting pixel drivers through the mesh-shaped wiring.

Therefore, to the extent that the first power line does not include a line that intersects the power auxiliary lines, the disposition width of the first power line may be reduced. Therefore, this facilitates the integration of light emitting pixel drivers, which may be advantageous for achieving high resolution of display devices.

However, effects according to the embodiments of the present disclosure are not limited to those exemplified above and various other effects are incorporated herein.

BRIEF DESCRIPTION OF THE DRAWINGS

The above and other aspects and features of the present disclosure will become more apparent by describing in detail embodiments thereof with reference to the attached drawings.

DETAILED DESCRIPTION OF THE EMBODIMENTS

Figure 1:
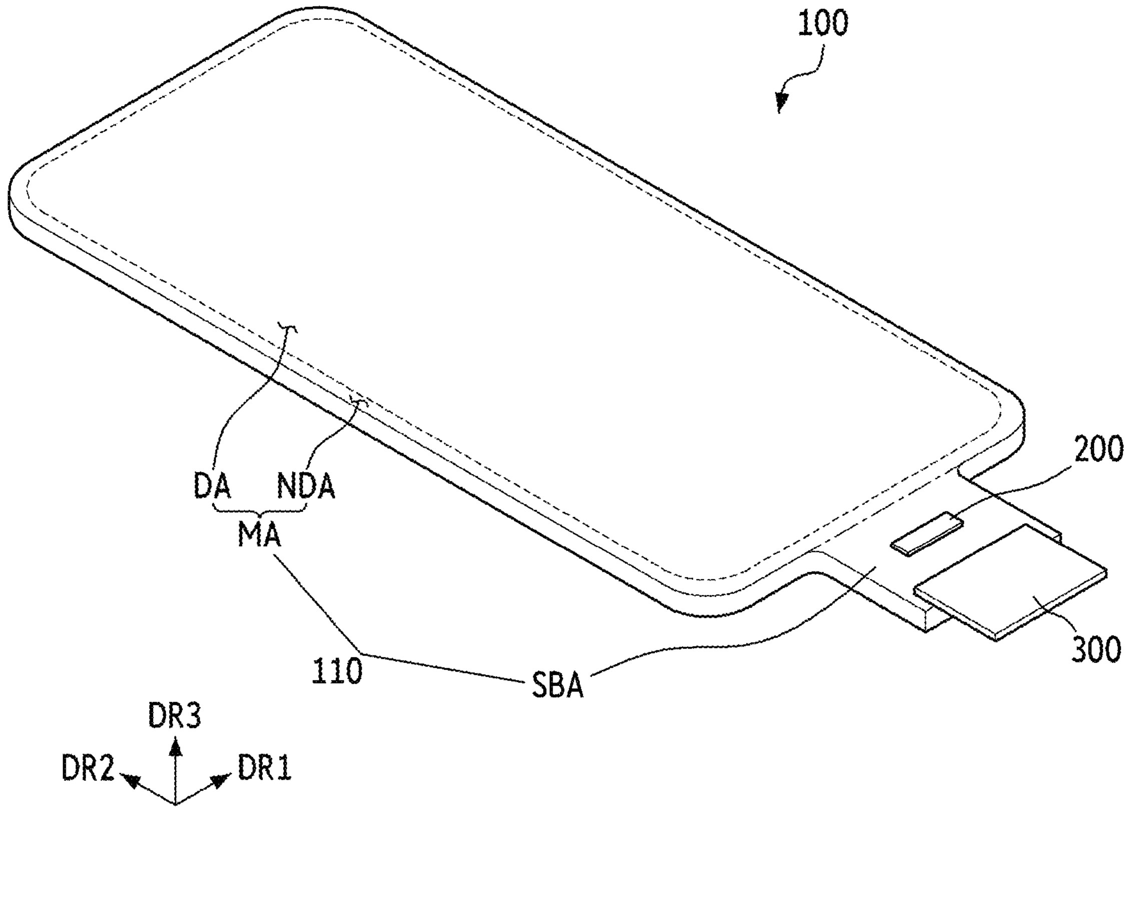
FIG. 1 is a perspective view illustrating a display device according to embodiments.

The embodiments will now be described more fully hereinafter with reference to the accompanying drawings. The embodiments may, however, be provided in different forms and should not be construed as limiting. The same reference numbers indicate the same components throughout the disclosure. In the accompanying figures, the thickness of layers and regions may be exaggerated for clarity.

Some of the parts which are not associated with the description may not be provided in order to describe embodiments of the disclosure.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

When an element is referred to as being "connected" or "coupled" to another element, the element may be "directly connected" or "directly coupled" to another element, or "electrically connected" or "electrically coupled" to another element with one or more intervening elements interposed therebetween. It will be further understood that when the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within ±30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments will be described with reference to the accompanying drawings.

Figure 2:
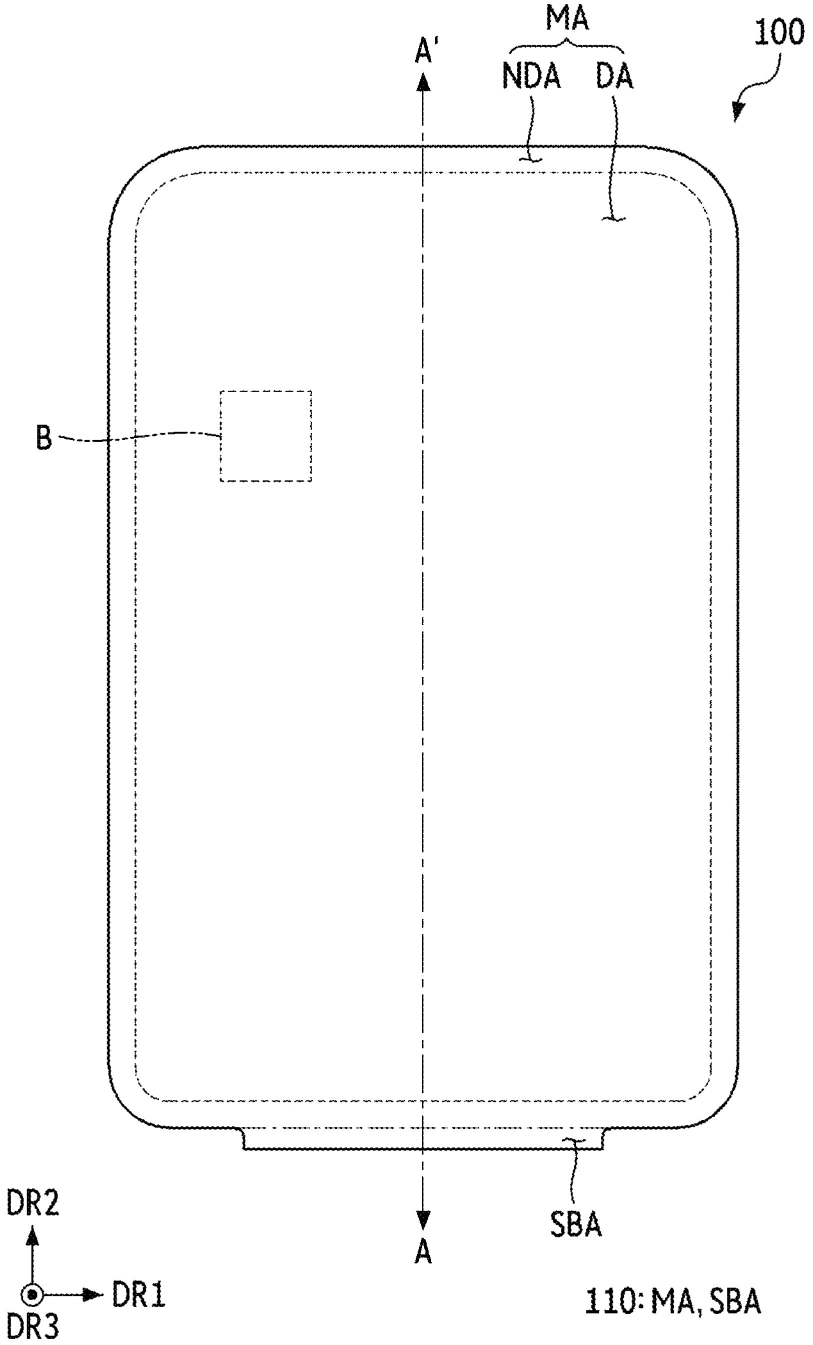
FIG. 2 is a plan view illustrating the display device of FIG. 1.
Figure 3:
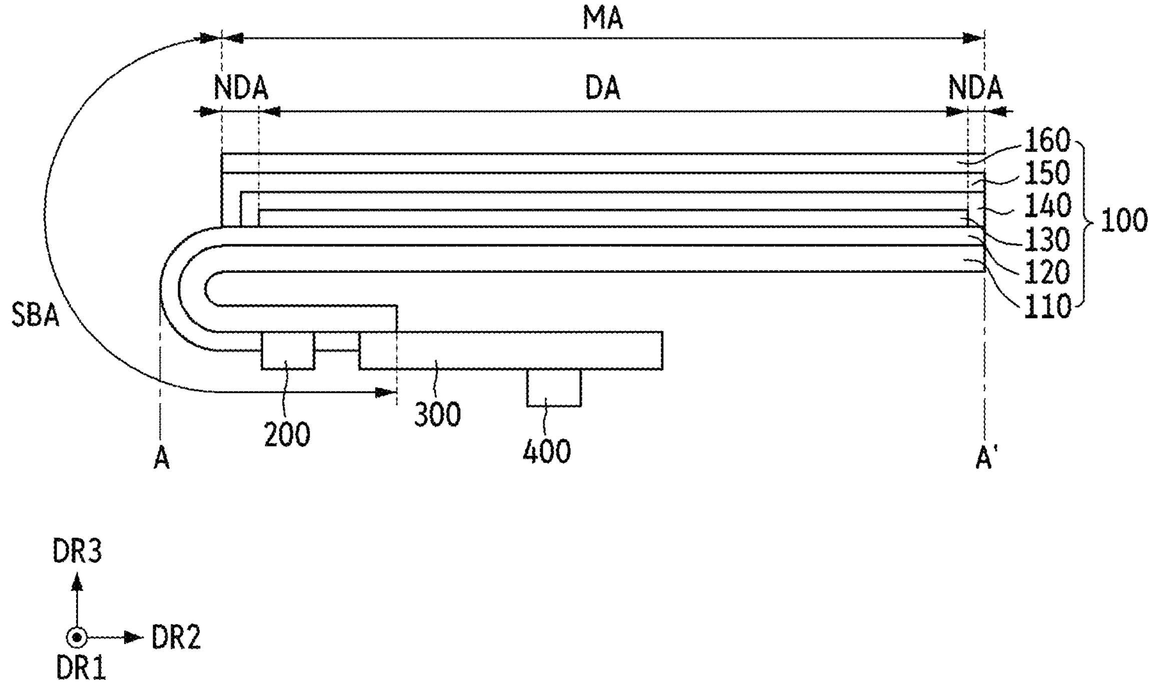
FIG. 3 is a cross-sectional view taken along line A-A' of FIG. 2.

FIG. 1 is a perspective view illustrating a display device 100 according to embodiments. FIG. 2 is a plan view illustrating the display device 100 of FIG. 1. FIG. 3 is a cross-sectional view taken along line A-A' of FIG. 2.

Referring to FIGS. 1 and 2, the display device 100 which is a device for displaying a moving image or a still image, may be used as a display screen of various devices, such as a television, a laptop computer, a monitor, a billboard and an Internet-of-Things (IoT) device, as well as portable electronic devices such as a mobile phone, a smartphone, a tablet personal computer (PC), a smart watch, a watch phone, a mobile communication terminal, an electronic notebook, an electronic book, a portable multimedia player (PMP), a navigation device and an ultra-mobile PC (UMPC).

The display device 100 may be a light emitting display device such as an organic light emitting display using an organic light emitting diode, a quantum dot light emitting display including a quantum dot light emitting layer, an inorganic light emitting display including an inorganic semiconductor, and a micro light emitting display using a micro or nano light emitting diode (LED). In the following description, it is assumed that the display device 100 is an organic light emitting display device. However, the present disclosure is not limited thereto, and may be applied to a display device including an organic insulating material, an organic light emitting material, and a metal material.

The display device 100 may be formed to be flat, but is not limited thereto. For example, the display device 100 may include a curved portion formed at left and right ends and having a constant curvature or a varying curvature. In addition, the display device 100 may be formed to be flexible so that it can be curved, bent, folded, or rolled.

As illustrated in FIGS. 1, 2 and 3, the display device 100 includes a substrate 110.

The substrate 110 may include a main region MA corresponding to a display surface of the display device 100 and a sub-region SBA protruding from one side of the main region MA.

As shown in FIG. 2, the main region MA may include a display area DA disposed at most of the center thereof, and a non-display area NDA disposed around the display area DA.

The display area DA may, in plan view, e.g., in a third direction DR3, be formed in a rectangular shape having short sides in a first direction DR1 and long sides in a second direction DR2 crossing the first direction DR1. The corner where the short side in the first direction DR1 and the long side in the second direction DR2 meet may be rounded to have a predetermined curvature or may be right-angled. The planar shape of the display area DA is not limited to the rectangular shape, and may be formed in another polygonal shape, a circular shape or an elliptical shape.

The non-display area NDA may be disposed at the edge of the main region MA to surround the display area DA.

The sub-region SBA may be a region extending in the second direction DR2 from a part of one side of the main region MA extending in the first direction DR1.

The sub-region SBA may include a bending area BA (see FIG. 6) that is transformed into a bent shape.

FIGS. 2 and 3 illustrate the display device 100 with a part of the sub-region SBA in a bent state.

Figure 6:
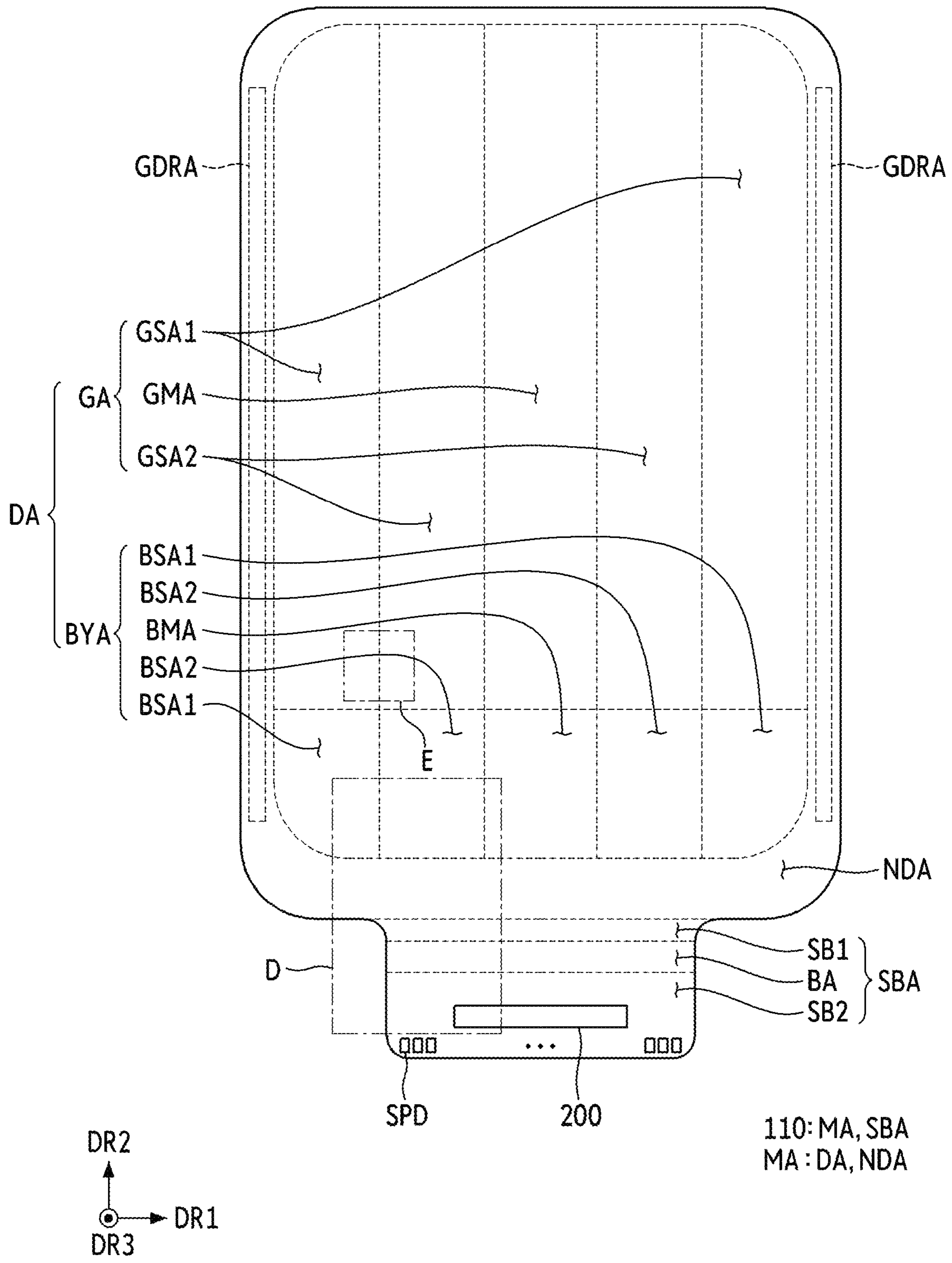
FIG. 6 is a plan view illustrating the substrate of FIG. 3 according to an embodiment.

As shown in FIGS. 2, 3, and 6, the sub-region SBA may include the bending area BA that is transformed into a bent shape, a first sub-region SB1 disposed between one side of the main region MA and one side of the bending area BA, and a second sub-region SB2 extending from the other side of the bending area BA.

When the bending area BA is transformed into a bent shape, the second sub-region SB2 may be disposed on the rear surface of the display device 100 and may overlap the main region MA.

A display driving circuit 200 provided as an integrated circuit (IC) chip may be mounted in the second sub-region SB2.

A circuit board 300 may be bonded to one side of the second sub-region SB2.

A touch driving circuit 400 provided as an integrated circuit (IC) chip may be mounted on the circuit board 300.

Referring to FIG. 3, the display device 100 according to embodiments includes the substrate 110, a circuit layer 120 disposed on the substrate 110, and an element layer 130 disposed on the circuit layer 120.

The display device 100 according to embodiments may further include an encapsulation layer 140 disposed on the element layer 130, and a touch sensor layer 150 disposed on the encapsulation layer 140.

Also, the display device 100 according to embodiments may further include a polarization layer 160 disposed on the touch sensor layer 150 to reduce reflection of external light.

The substrate 110 may be formed of an insulating material such as a polymer resin. For example, the substrate 110 may be formed of polyimide. The substrate 110 may be a flexible substrate which can be bent, folded or rolled.

In an embodiment, the substrate 110 may be formed of an insulating material such as glass or the like.

The substrate 110 may include the main region MA and the sub-region SBA. The main region MA may include the display area DA and the non-display area NDA.

Figure 4:
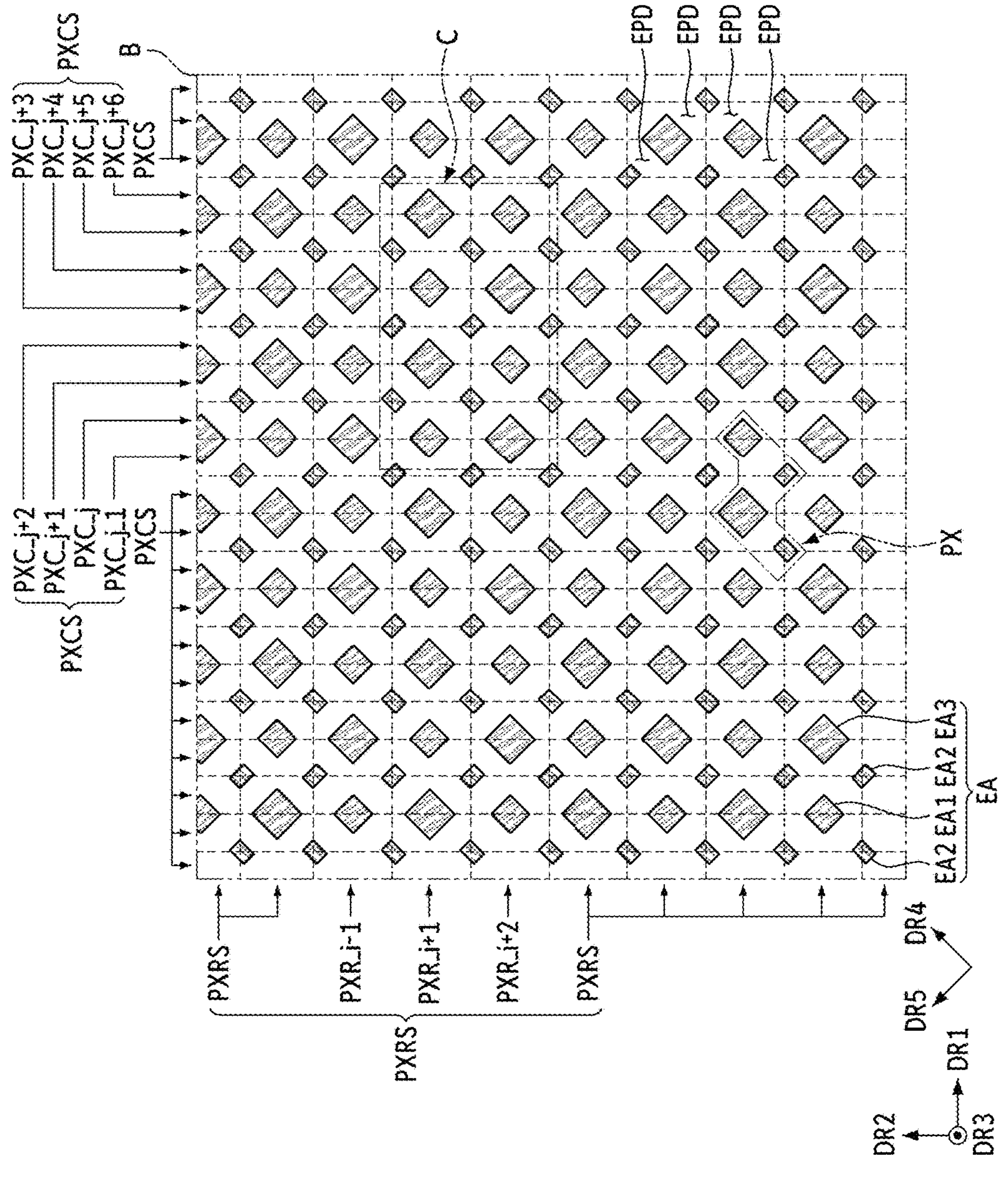
FIG. 4 is a layout diagram showing part B of FIG. 2 according to an embodiment.

The element layer 130 may include light emitting elements LE (see FIG. 5) respectively disposed in the emission areas EA (see FIG. 4).

The circuit layer 120 may include light emitting pixel drivers EPD (see FIG. 4) electrically connected to the light emitting elements LE of the element layer 130, respectively.

The encapsulation layer 140 is disposed on the element layer 130 and may have a structure in which at least one organic film is interposed between two or more inorganic films.

The touch sensor layer 150 may include touch electrodes for detecting a signal that varies depending on the touch of a person or an object and sensing a point in the main region MA in which the touch of the person or the object has occurred.

The polarization layer 160 blocks external light reflected from the touch sensor layer 150, the encapsulation layer 140, the element layer 130, and the circuit layer 120, and the interfaces thereof, and this is to prevent the deterioration of visibility of an image due to external light reflection.

According to embodiments, the display device 100 may further include the display driving circuit 200, provided as an integrated circuit (IC) chip and mounted on the sub-region SBA of the substrate 110.

The display driving circuit 200 may supply data signals Vdata (see FIG. 5) to data lines DL (see FIG. 5) of the circuit layer 120.

According to embodiments, the display device 100 may further include the circuit board 300 bonded to the sub-region SBA of the substrate 110. The circuit board 300 may be bonded to pads (e.g., see signal pads SPD of FIG. 6) disposed in the sub-region SBA of the substrate 110 by using a low-resistance, high-reliability material such as an anisotropic conductive film or SAP.

The touch driving circuit 400 may be mounted on the circuit board 300.

When the touch sensor layer 150 includes capacitive touch electrodes and sensing electrodes, the touch driving circuit 400 may detect a touch based on a change in capacitance. However, this is merely an example, and the touch sensor layer 150 and the touch driving circuit 400 of FIG. 3 may be provided with a touch detection method other than the capacitive method.

FIG. 4 is a layout diagram showing part B of FIG. 2 according to an embodiment.

Referring to FIG. 4, the display area DA of the display device 100 according to embodiments may include the emission areas EA. In addition, the display area DA may further include a non-emission area disposed in a gap between the emission areas EA.

The emission areas EA may have a rhombic shape or a rectangular shape in plan view. However, this is only an example, and the planar shape of the emission areas EA according to an embodiment is not limited to that illustrated in FIG. 4. That is, in plan view, the emission areas EA may have a polygonal shape such as a quadrangle, a pentagon, and a hexagon, or may have a circular or elliptical shape including the edge of a curve.

The emission areas EA may include first emission areas EA1 emitting light of a first color in a predetermined wavelength band, second emission areas EA2 emitting light of a second color in a wavelength band lower than that of the first color, and third emission areas EA3 emitting light of a third color in a wavelength band lower than that of the second color.

For example, the first color may be red having a wavelength band of about 600 nm to about 750 nm. The second color may be green having a wavelength band of about 480 nm to about 560 nm. The third color may be blue having a wavelength band of about 370 nm to about 460 nm.

The first emission areas EA1 and the third emission areas EA3 may be arranged alternately at least one by one in the first direction DR1 or the second direction DR2.

The second emission area EA2 may be arranged parallel to each other in the first direction DR1 and the second direction DR2.

The second emission areas EA2 may be adjacent to the first emission areas EA1 and the third emission areas EA3 in diagonal directions DR4 and DR5 crossing the first direction DR1 and the second direction DR2.

The pixels PX displaying respective luminances and colors may be provided by at least one first emission area EA1, at least one second emission area EA2, and at least one third emission area EA3 that are adjacent to each other, among these emission areas EA.

In other words, the pixel PX may be a basic unit for displaying various colors including white with a predetermined luminance.

Each of the pixels PX may include at least one first emission area EA1, at least one second emission area EA2, and at least one third emission area EA3 that are adjacent to each other. Accordingly, each of the pixels PX may display various colors through a mixture of the light emitted from the first emission area EA1, the second emission area EA2, and the third emission area EA3 that are adjacent to each other.

The element layer 130 (see FIG. 3) of the display device 100 may include the light emitting elements LE (see FIGS. 5 and 17) disposed in the emission areas EA.

The circuit layer 120 (see FIG. 3) of the display device 100 may include the light emitting pixel drivers EPD that are electrically connected to the light emitting elements LE.

The light emitting pixel drivers EPD may be arranged in a plurality of pixel columns PXRS and a plurality of pixel rows PXCS in the display area DA.

Each of the pixel columns PXRS may include the light emitting pixel drivers EPD arranged in the first direction DR1.

Each of the pixel rows PXCS may include the light emitting pixel drivers EPD arranged in the second direction DR2.

Figure 5:
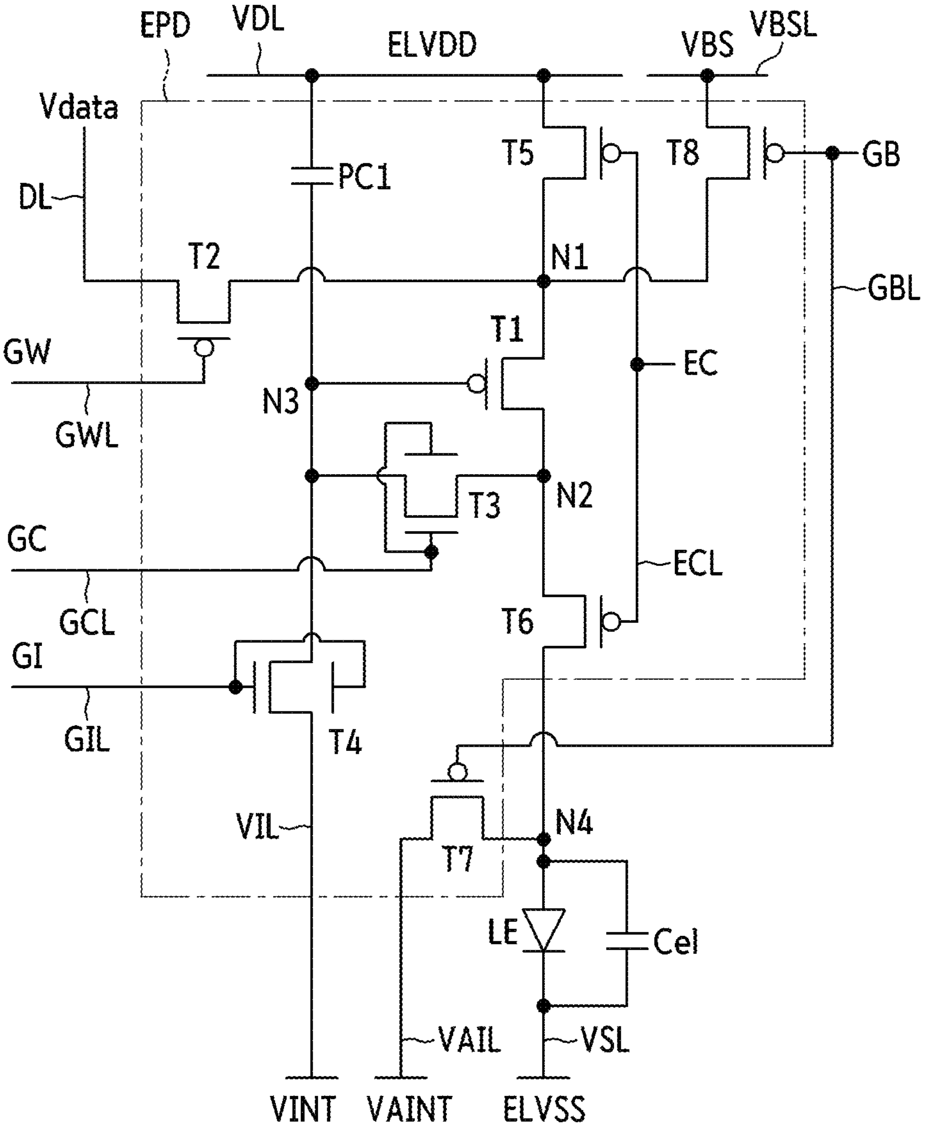
FIG. 5 is an equivalent circuit diagram showing the light emitting pixel driver of FIG. 4 according to embodiments.

FIG. 5 is an equivalent circuit diagram showing the light emitting pixel driver of FIG. 4 according to embodiments.

Referring to FIG. 5, one of the light emitting pixel drivers EPD may be electrically connected between a first power source ELVDD and one of the light emitting elements LE. One light emitting element LE may be electrically connected between one light emitting pixel driver EPD and a second power source ELVSS.

The second power source ELVSS may be at a voltage level lower than that of the first power source ELVDD.

That is, the anode electrode of the light emitting element LE is electrically connected to the light emitting pixel driver EPD, and the cathode electrode of the light emitting element LE may be applied with a voltage of the second power source ELVSS having a voltage level lower than the first power source ELVDD.

A capacitor Cel connected in parallel with the light emitting element LE refers to a parasitic capacitance between the anode electrode and the cathode electrode.

The circuit layer 120 (see FIG. 3) may include a first power line VDL that transmits the first power source ELVDD to the light emitting pixel drivers EPD.

The circuit layer 120 may further include a gate initialization voltage line VIL that transmits a gate initialization voltage VINT, an anode initialization voltage line VAIL that transmits an anode initialization voltage VAINT, and a bias voltage line VBSL that transmits a bias voltage VBS.

The circuit layer 120 may further include a scan write line GWL for transmitting a scan write signal GW, a scan initialization line GIL for transmitting a scan initialization signal GI, an emission control line ECL for transmitting an emission control signal EC, a gate control line GCL for transmitting a gate control signal GC, and a bias control line GBL for transmitting a bias control signal GB.

One light emitting pixel driver EPD of the circuit layer 120 may include a first transistor T1 configured to generate a driving current for driving the light emitting element LE, two or more transistors T2 to T8 electrically connected to the first transistor T1, and at least one capacitor PC1.

The first transistor T1 may be electrically connected between a first node N1 and a second node N2. The first node N1 is electrically connected to the first electrode (e.g., source electrode) of the first transistor T1. The second node N2 is electrically connected to the second electrode (e.g., drain electrode) of the first transistor T1.

The pixel capacitor PC1 may be electrically connected between the first power line VDL and a third node N3. The third node N3 is electrically connected to the gate electrode of the first transistor T1.

The second transistor T2 may be electrically connected between the data line DL and the first node N1.

That is, the first electrode of the first transistor T1 may be electrically connected to the data line DL through the second transistor T2.

The second transistor T2 may be turned on by the scan write signal GW of the scan write line GWL.

The fifth transistor T5 may be electrically connected between the first node N1 and the first power line VDL.

The sixth transistor T6 may be electrically connected between the second node N2 and a fourth node N4. The fourth node N4 is electrically connected to the anode electrode of the light emitting element LE.

That is, the fifth transistor T5 may be electrically connected between the first electrode of the first transistor T1 and the first power line VDL.

The sixth transistor T6 may be electrically connected between the second electrode of the first transistor T1 and the anode electrode of the light emitting element LE.

The fifth transistor T5 and the sixth transistor T6 may be turned on by the emission control signal EC of the emission control line ECL.

The gate electrode of the first transistor T1 may be electrically connected to the first power line VDL through the pixel capacitor PC1.

Since the third node N3 is electrically connected to the first power line VDL through the pixel capacitor PC1, the potential of the gate electrode of the first transistor T1 may be maintained at the voltage charged in the first power line VDL.

Accordingly, when the data signal Vdata of the data line DL is transmitted to the first node N1 through the turned-on second transistor T2, the voltage difference between the gate electrode of the first transistor T1 and the first electrode of the first transistor T1 may correspond to a difference voltage between the first power source ELVDD and the data signal Vdata.

In this case, when the voltage difference between the gate electrode of the first transistor T1 and the first electrode of the first transistor T1, i.e., the gate-source voltage difference becomes equal to or greater than a threshold voltage, the first transistor T1 may be turned on, thereby generating a drain-source current of the first transistor T1 corresponding to the data signal Vdata.

When the fifth transistor T5 and the sixth transistor T6 are turned on, the first transistor T1 may be connected in series with the light emitting element LE between the first power line VDL and a second power line VSL that transmits the second power source ELVSS. Accordingly, the drain-source current of the first transistor T1 corresponding to the data signal Vdata may be supplied as a driving current of the light emitting element LE.

Accordingly, the light emitting element LE may emit light having a luminance corresponding to the data signal Vdata.

The third transistor T3 may be electrically connected between the second node N2 and the third node N3. That is, the third transistor T3 may be electrically connected between the gate electrode of the first transistor T1 and the second electrode of the first transistor T1.

The third transistor T3 may be turned on by the gate control signal GC of the gate control line GCL.

Through the turned-on third transistor T3, the voltage difference between the second node N2 and the third node N3 may be initialized.

The fourth transistor T4 may be electrically connected between the gate initialization voltage line VIL and the third node N3. That is, the fourth transistor T4 may be connected between the gate electrode of the first transistor T1 and the gate initialization voltage line VIL.

The fourth transistor T4 may be turned on by the scan initialization signal GI of the scan initialization line GIL.

The potential of the third node N3 may be initialized through the turned-on fourth transistor T4.

The third transistor T3 and the fourth transistor T4 may be provided as N-type MOSFETs.

The seventh transistor T7 may be electrically connected between the fourth node N4 and the anode initialization voltage line VAIL. That is, the seventh transistor T7 may be electrically connected between the anode electrode of the light emitting element LE and the anode initialization voltage line VAIL.

The seventh transistor T7 may be turned on by the bias control signal GB of the bias control line GBL.

The potential of the fourth node N4 may be initialized through the turned-on seventh transistor T7.

The eighth transistor T8 may be electrically connected between the first node N1 and the bias voltage line VBSL. That is, the eighth transistor T8 may be electrically connected between the first electrode of the first transistor T1 and the bias voltage line VBSL.

The eighth transistor T8 may be turned on by the bias control signal GB of the bias control line GBL.

The potential of the first node N1 may be initialized through the turned-on eighth transistor T8.

According to an embodiment, the third transistor T3 and the fourth transistor T4 among the first to eighth transistors T1 to T8 included in the light emitting pixel driver EPD are provided as N-type MOSFETs, and the remaining transistors T1, T2, and T5 to T8 except for the third transistor T3 and the fourth transistor T4 may be provided as P-type MOSFETs.

To this end, the circuit layer 120 may include a first semiconductor layer SEL1 (see FIG. 12) for providing the P-type MOSFETs and a second semiconductor layer SEL2 (see FIG. 14) for providing the N-type MOSFETs.

The first semiconductor layer SEL1 may include a channel portion, a first electrode portion, and a second electrode portion of each of the P-type MOSFETs T1, T2, T5, T6, T7, and T8 (see FIG. 5).

The second semiconductor layer SEL2 may include a channel portion, a first electrode portion, and a second electrode portion of each of the N-type MOSFETs T3 and T4 (see FIG. 5).

In each of the transistors, the first electrode portion may be connected to one side of the channel portion, and the second electrode portion may be connected to the other side of the channel portion.

The first electrode portion may be a first electrode or a source electrode.

The second electrode portion may be a second electrode or a drain electrode.

FIG. 6 is a plan view illustrating the substrate 110 of FIG. 3 according to an embodiment.

Referring to FIG. 6, the substrate 110 of the display device 100 according to embodiments includes the main region MA corresponding to the display surface, and the sub-region SBA protruding from a part of one side of the main region MA.

The main region MA may include the display area DA disposed at most of the center, and the non-display area NDA disposed at the periphery to surround the display area DA.

The display area DA may include a bypass area BYA disposed on one side adjacent to the sub-region SBA, and a general area GA disposed in the remaining area excluding the bypass area BYA.

The bypass area BYA may include a bypass middle area BMA disposed at the center in the first direction DR1, a first bypass side area BSA1 parallel to the bypass middle area BMA in the first direction DR1 and in contact with the non-display area NDA, and a second bypass side area BSA2 disposed between the bypass middle area BMA and the first bypass side area BSA1.

The first bypass side area BSA1 may be disposed adjacent to the bent corner of the substrate 110 as compared to the bypass middle area BMA and the second bypass side area BSA2.

The first bypass side area BSA1 and the second bypass side area BSA2 may be disposed between the bypass middle area BMA and the non-display area NDA on both sides of the bypass middle area BMA in the first direction DR1.

The general area GA may include a general middle area GMA connected to the bypass middle area BMA of the bypass area BYA in the second direction DR2, a first general side area GSA1 connected to the first bypass side area BSA1 of the bypass area BYA in the second direction DR2, and a second general side area GSA2 connected to the second bypass side area BSA2 of the bypass area BYA in the second direction DR2.

The non-display area NDA may include a gate driving circuit area GDRA where a gate driving circuit is disposed.

The gate driving circuit area GDRA may face one side of the display area DA extending in the second direction DR2 in the non-display area NDA.

The gate driving circuit of the gate driving circuit area GDRA may sequentially transmit gate signals to gate lines. Here, the gate lines may include the scan write line GWL (see FIG. 5) that transmits the scan write signal GW (see FIG. 5), the scan initialization line GIL (see FIG. 5) that transmits the scan initialization signal GI (see FIG. 5), the gate control line GCL (see FIG. 5) that transmits the gate control signal GC (see FIG. 5), the bias control line GBL (see FIG. 5) that transmits the bias control signal GB (see FIG. 5), and the emission control line ECL (see FIG. 5) that transmits the emission control signal EC (see FIG. 5).

The sub-region SBA may include the bending area BA that is transformed into a bent shape, the first sub-region SB1 disposed between one side of the bending area BA and the main region MA, and the second sub-region SB2 connected to the other side of the bending area BA.

When the bending area BA is transformed into a bent shape, the second sub-region SB2 is disposed below the substrate 110 and overlaps the main region MA.

The display driving circuit 200 may be disposed in the second sub-region SB2.

The signal pads SPD bonded to the circuit board 300 (see FIG. 3) may be arranged at one edge of the second sub-region SB2.

Figure 7:
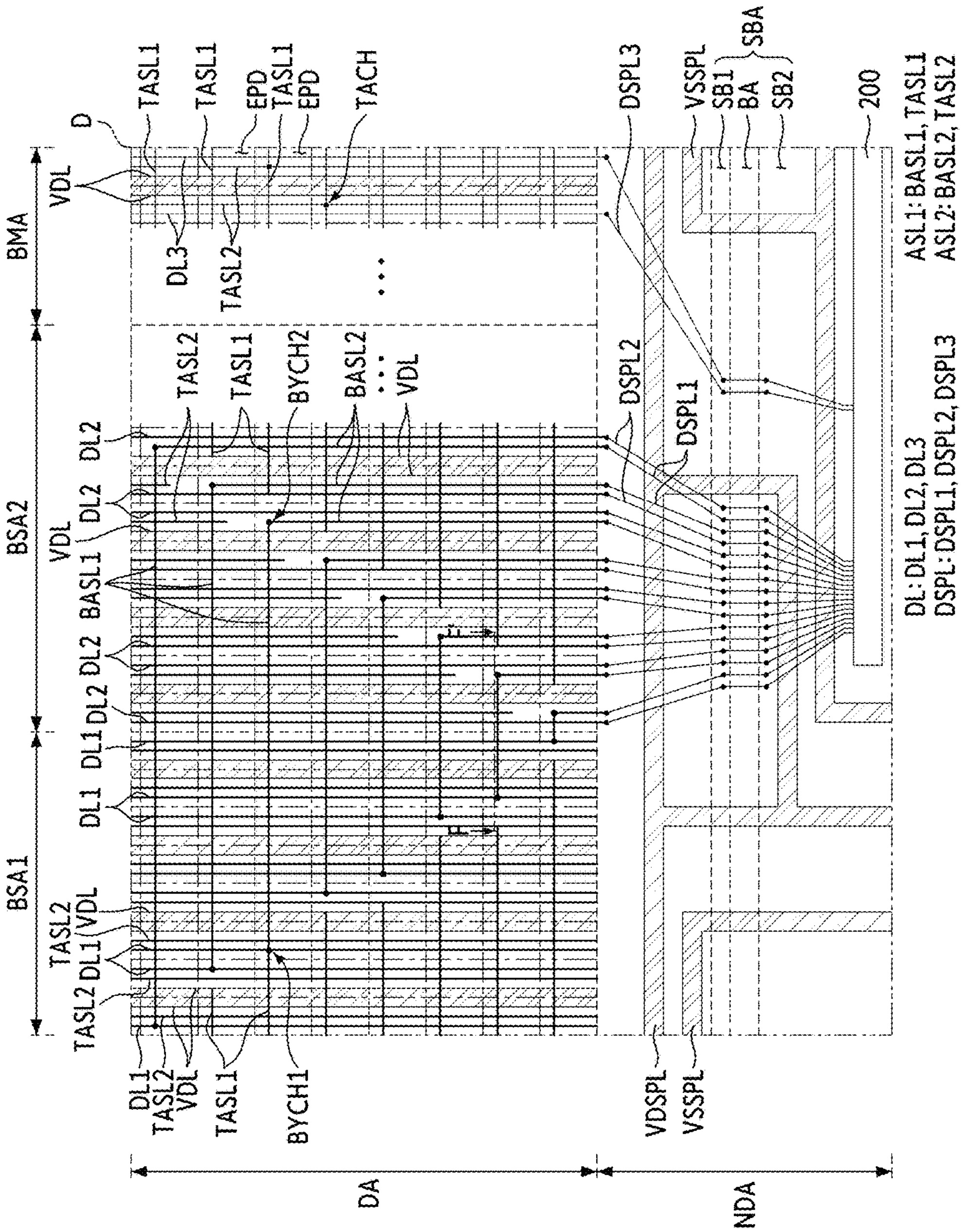
FIG. 7 is a layout diagram illustrating the circuit layer of part D of FIG. 6.
Figure 8:
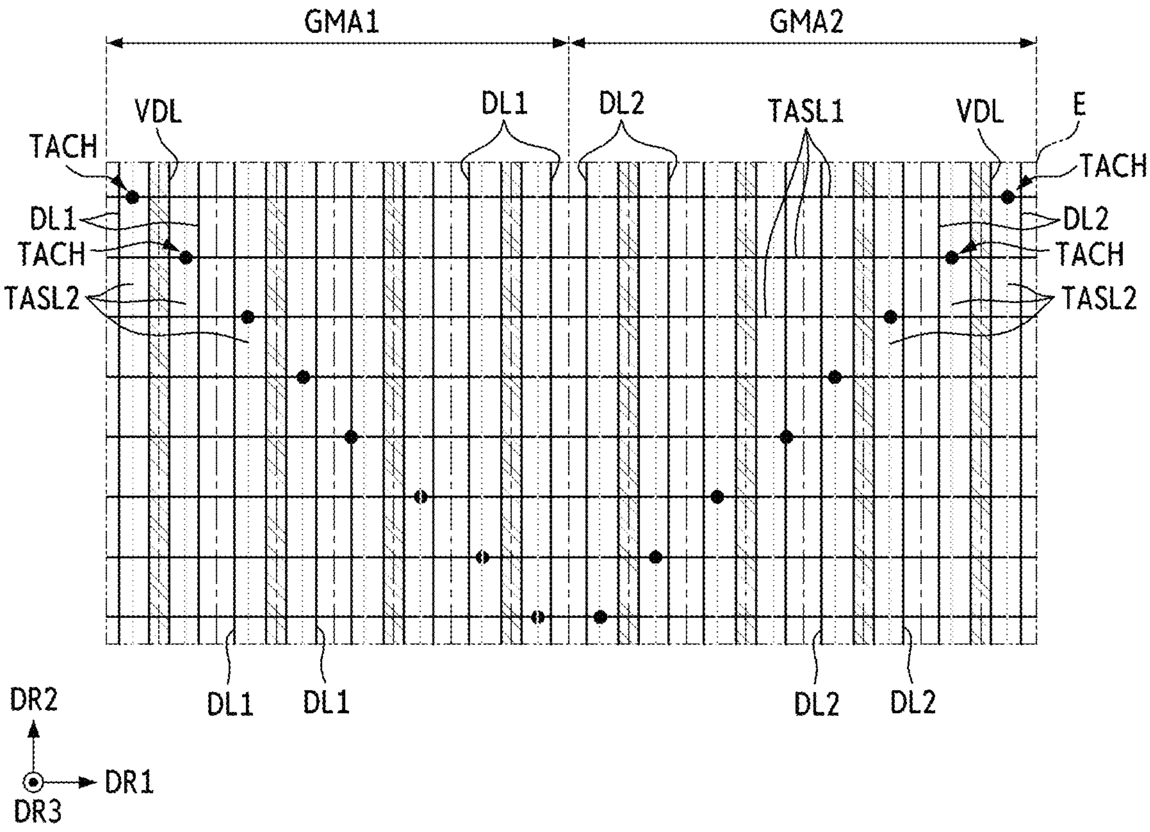
FIG. 8 is a layout diagram illustrating the circuit layer of part E of FIG. 6.
Figure 9:
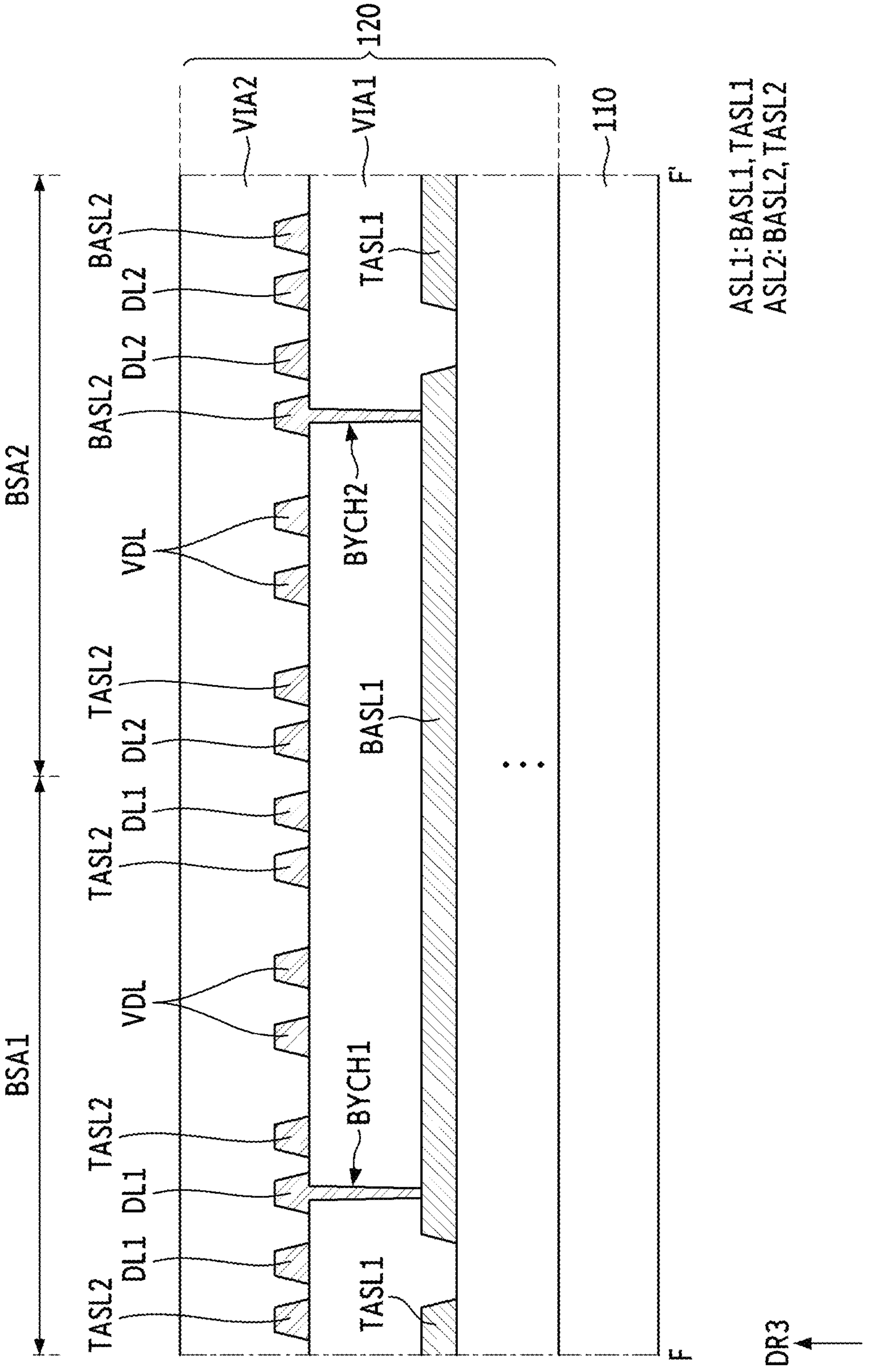
FIG. 9 is a cross-sectional view taken along line F-F' of FIG. 7.

FIG. 7 is a layout diagram illustrating the circuit layer of part D of FIG. 6. FIG. 8 is a layout diagram illustrating the circuit layer of part E of FIG. 6. FIG. 9 is a cross-sectional view taken along line F-F' of FIG. 7.

Referring to FIGS. 7 and 8, the circuit layer 120 (see FIG. 3) of the display device 100 according to embodiments may include the light emitting pixel drivers EPD electrically connected respectively to the light emitting elements LE (see FIG. 5) of the element layer 130 (see FIG. 3) and parallel to each other in the first direction DR1 and the second direction DR2, the data lines DL extending in the second direction DR2 and transmitting the data signals Vdata to the light emitting pixel drivers EPD, first auxiliary lines ASL1 extending in the first direction DR1, and second auxiliary lines ASL2 extending in the second direction DR2 and neighboring the data lines DL, respectively.

The first auxiliary lines ASL1 may include a first bypass auxiliary line BASL1 electrically connected to a first data line DL1 among the data lines DL, which is adjacent to the non-display area NDA in the first direction DR1, and first transmission auxiliary lines TASL1 other than the first bypass auxiliary line BASL1.

The first bypass auxiliary line BASL1 may be disposed in the first bypass side area BSA1 and the second bypass side area BSA2 of the bypass area BYA.

The second auxiliary lines ASL2 may include a second bypass auxiliary line BASL2 electrically connected to the first bypass auxiliary lines BASL1, and second transmission auxiliary lines TASL2 other than the second bypass auxiliary line BASL2. The second bypass auxiliary line BASL2 may neighbor a second data line DL2 among the data lines DL, which is spaced further apart from the non-display area NDA in the first direction DR1 than the first data line DL1.

The second bypass auxiliary line BASL2 may be disposed in the second bypass side area BSA2 of the bypass area BYA.

At least some of the first transmission auxiliary lines TASL1 and at least some of the second transmission auxiliary lines TASL2 may transmit the voltage of the second power source ELVSS (see FIG. 5).

The data lines DL may include the first data line DL1 disposed in the first bypass side area BSA1 and the second data line DL2 disposed in the second bypass side area BSA2.

According to embodiments, the circuit layer 120 may further include data supply lines DSPL disposed in the non-display area NDA and electrically connected to the display driving circuit 200 and the data lines DL.

The data supply lines DSPL may extend to the bypass middle area BMA and the second bypass side area BSA2.

The data supply lines DSPL may include a first data supply line DSPL1 that transmits the data signal of the first data line DL1, and a second data supply line DSPL2 that transmits the data signal of the second data line DL2.

The first data supply line DSPL1 may extend to the second bypass auxiliary line BASL2 of the second bypass side area BSA2, and may be electrically connected to the first data line DL1 through the second bypass auxiliary line BASL2 and the first bypass auxiliary line BASL1.

On the other hand, the second data supply line DSPL2 may extend to the second bypass side area BSA2, and may be electrically connected to the second data line DL2 directly.

In this way, since the first data supply line DSPL1 extends not to the first data line DL1 of the first bypass side area BSA1 but to the second bypass auxiliary line BASL2 of the second bypass side area BSA2, the extension length of the first data supply line DSPL1 may be shortened. As a result, the width of the area required for the disposition of the data supply lines DSPL may be reduced, so that the width of the non-display area NDA may be reduced.

In addition, since the data supply lines DSPL are not disposed in some areas of the non-display area NDA, which are adjacent to the bent edge of the substrate 110, the width of the non-display area NDA may be further reduced.

The data lines DL may further include a third data line DL3 disposed in the bypass middle area BMA. In addition, the data supply lines DSPL may further include a third data supply line DSPL3 that transmits the data signal of the third data line DL3.

The third data supply line DSPL3 may extend to the bypass middle area BMA, and may be directly electrically connected to the third data line DL3.

The first bypass auxiliary line BASL1 may be disposed between the first data line DL1 and the second bypass auxiliary line BASL2.

The second bypass auxiliary line BASL2 may be disposed between the first data supply line DSPL1 and the first bypass auxiliary line BASL1 in the non-display area NDA.

In this way, as the first bypass auxiliary line BASL1 and the second bypass auxiliary line BASL2 are limitedly arranged in the bypass area BYA, the ends of the first bypass auxiliary line BASL1 and the ends of the second bypass auxiliary line BASL2 are arranged with regularity. Accordingly, visibility of the first bypass auxiliary line BASL1 and the second bypass auxiliary line BASL2 may be increased.

To prevent this, the first auxiliary lines ASL1 may further include not only the first bypass auxiliary line BASL1 but also first transmission auxiliary lines TASL1. Also, the second auxiliary lines ASL2 may further include not only the second bypass auxiliary line BASL2 but also the second transmission auxiliary lines TASL2.

Two of the first transmission auxiliary lines TASL1 may extend from both ends of the first bypass auxiliary line BASL1 to the non-display area NDA.

One of the second transmission auxiliary lines TASL2 may extend from one end of the second bypass auxiliary line BASL2 to the non-display area NDA in a direction away from the sub-region SBA.

Since the second bypass auxiliary line BASL2 is disposed only in the second bypass side area BSA2, the first data line DL1 of the first bypass side area BSA1 may neighbor the second transmission auxiliary line TASL2 entirely.

The third data line DL3 of the bypass middle area BMA may neighbor the second transmission auxiliary line TASL2 entirely.

According to embodiments, the circuit layer 120 may further include a first power supply line VDSPL transmitting the voltage of the first power source ELVDD (see FIG. 5) and a second power supply line VSSPL transmitting the voltage of the second power source ELVSS (see FIG. 5).

The first power supply line VDSPL and the second power supply line VSSPL may be disposed in the non-display area NDA and may extend to the sub-region SBA.

The first power supply line VDSPL may be electrically connected to a first power pad for transmitting the voltage of the first power source ELVDD (see FIG. 5) among the signal pads SPD (see FIG. 6) disposed in the second sub-region SB2.

The second power supply line VSSPL (see FIG. 5) may be electrically connected to a second power pad for transmitting the voltage of the second power source ELVSS (see FIG. 5) among the signal pads SPD (see FIG. 6) disposed in the second sub-region SB2.

According to embodiments, the circuit layer 120 may further include the first power lines VDL transmitting the voltage of the first power source ELVDD (see FIG. 5) to the light emitting pixel drivers EPD.

The first power lines VDL may be electrically connected to the first power supply line VDSPL.

The first power lines VDL may be disposed between two second auxiliary lines ASL2 adjacent to each other in the first direction DR1.

According to an embodiment, two adjacent second auxiliary lines ASL2 among the second auxiliary lines ASL2 may be disposed between two first power lines VDL adjacent to each other in the first direction DR1 among the first power lines VDL.

Further, among the data lines DL, two facing data lines DL may be disposed between two adjacent second auxiliary lines ASL2.

As shown in FIG. 8, the first transmission auxiliary lines TASL1 among the first auxiliary lines ASL1 and the second transmission auxiliary lines TASL2 among the second auxiliary lines ASL2 may be disposed in the general area GA.

At least some of the first transmission auxiliary lines TASL1 and at least some of the second transmission auxiliary lines TASL2 may be electrically connected to each other through a transmission auxiliary connection hole TACH.

As shown in FIG. 9, the data lines DL, the second auxiliary lines ASL2, and the first power lines VDL may be disposed on at least one insulating layer VIA1 covering the first auxiliary lines ASL1 and may be covered with at least one insulating layer VIA2.

The first bypass auxiliary line BASL1 may be electrically connected to the first data line DL1 through a first bypass connection hole BYCH1, and may be electrically connected to the second bypass auxiliary line BASL2 through a second bypass connection hole BYCH2.

Each of the first bypass connection hole BYCH1 and the second bypass connection hole BYCH2 may penetrate the at least one insulating layer VIA1 covering the first auxiliary line ASL1.

Figure 10:
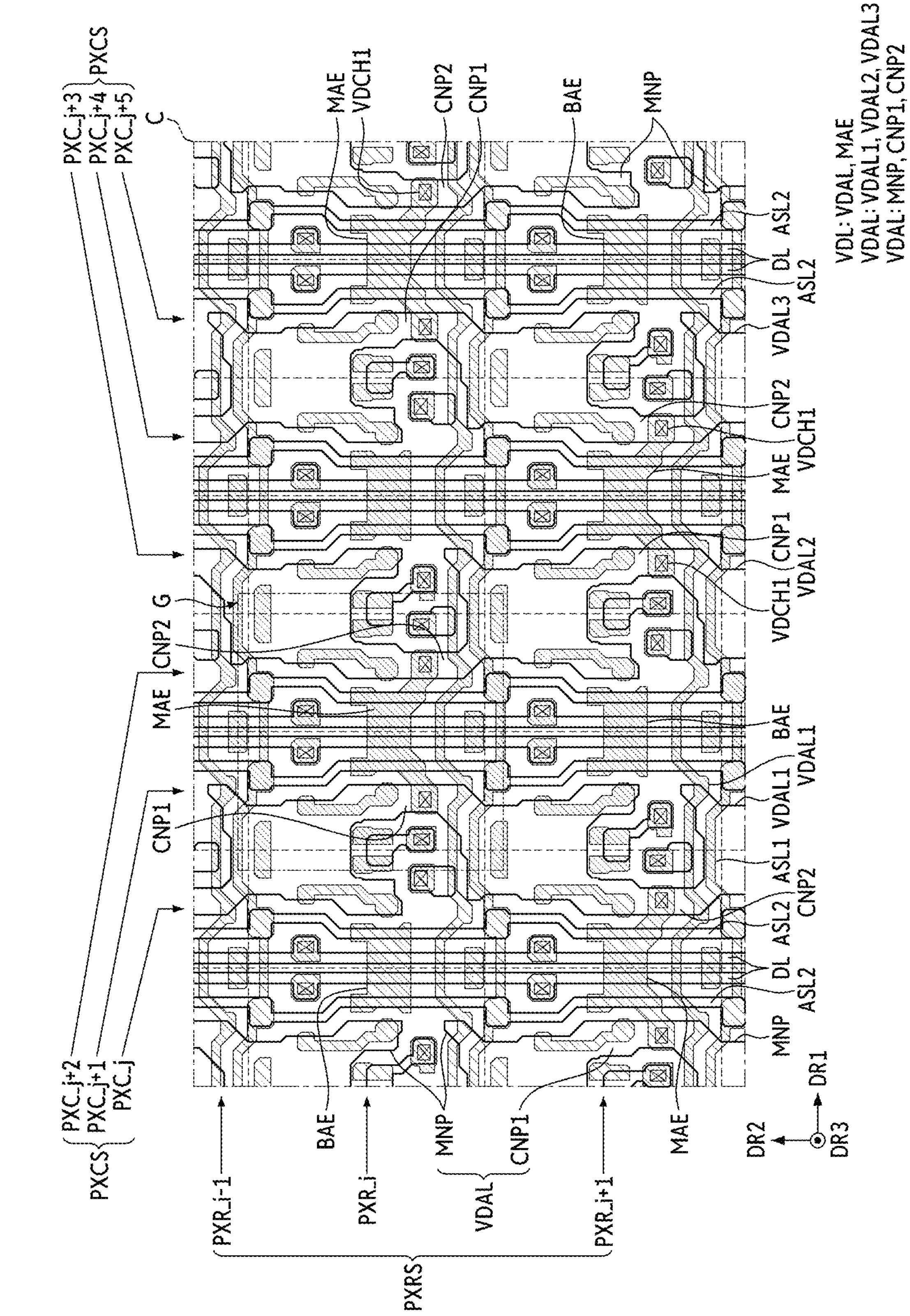
FIGS. 10 and 11 are plan views showing a circuit layer of part C of FIG. 4 according to an embodiment.
Figure 11:
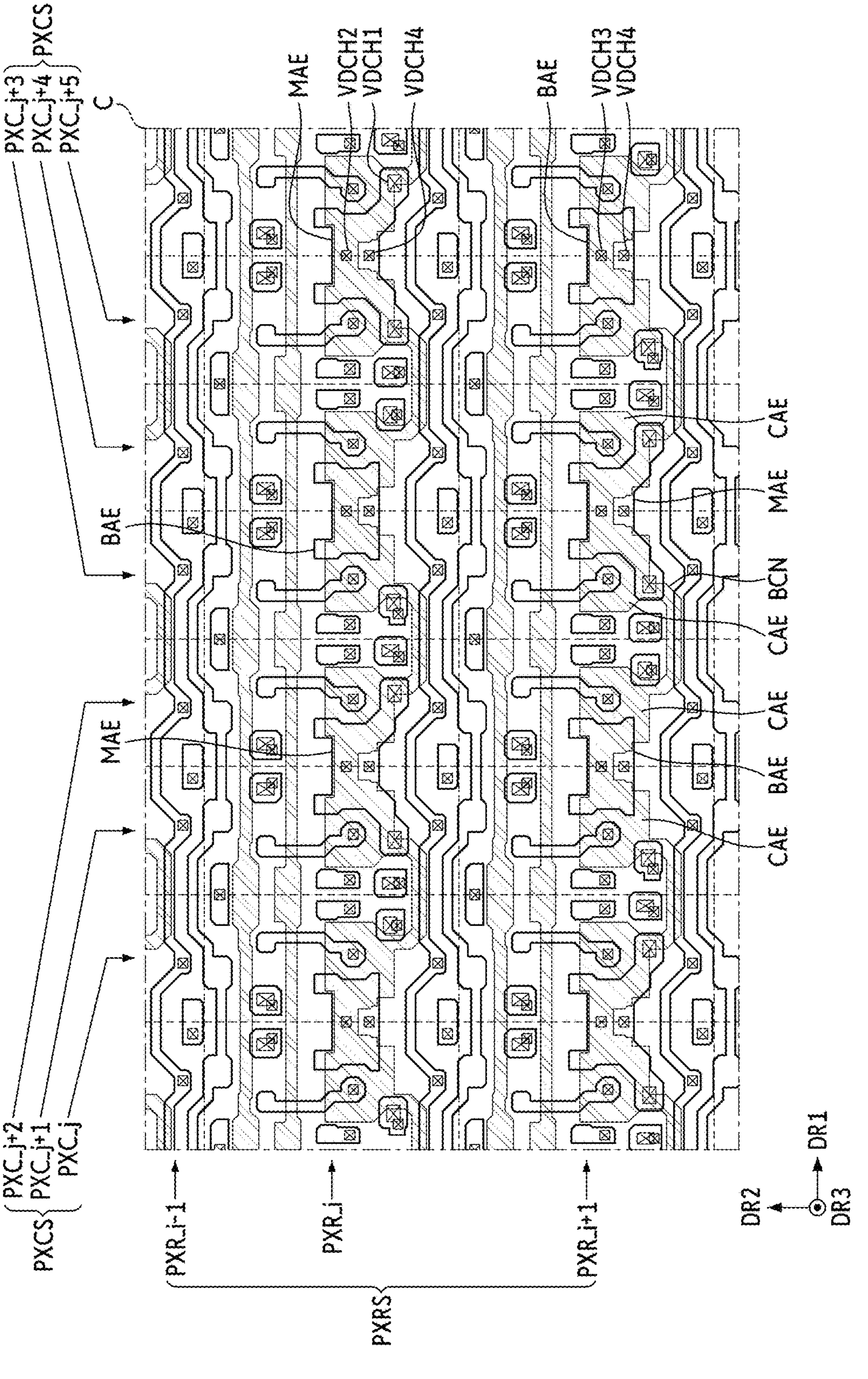

FIGS. 10 and 11 are plan views showing a circuit layer of part C of FIG. 4 according to an embodiment.

As shown in FIG. 10, the circuit layer 120 (see FIG. 3) of the display device 100 according to an embodiment may include the light emitting pixel drivers EPD arranged in the plurality of pixel columns PXRS and the plurality of pixel rows PXCS and the first power line VDL transmitting the voltage of the first power source ELVDD (see FIG. 5) to the light emitting pixel drivers EPD.

Each of the pixel columns PXRS may include the light emitting pixel drivers EPD arranged in the first direction DR1.

Each of the pixel rows PXCS may include the light emitting pixel drivers EPD arranged in the second direction DR2.

According to an embodiment, the first power line VDL may include the power auxiliary lines VDAL extending in the second direction DR2 and the mesh auxiliary electrodes MAE electrically connecting two power auxiliary lines VDAL adjacent each other, among the power auxiliary lines VDAL.

According to an embodiment, among the power auxiliary lines VDAL, two power auxiliary lines VDAL neighboring each other may be electrically connected to each other through the mesh auxiliary electrodes MAE disposed between the two power auxiliary lines VDAL and parallel to each other in the second direction DR2, among the mesh auxiliary electrodes MAE.

The mesh auxiliary electrodes MAE may be disposed in a shape of islands spaced apart from each other.

In this way, as the neighboring power auxiliary lines VDAL among the power auxiliary lines VDAL are electrically connected to each other by the mesh auxiliary electrodes MAE, the first power line VDL may become mesh-shaped even if it does not include lines intersecting the power auxiliary lines VDAL.

According to an embodiment, one of the power auxiliary lines VDAL may include main portions MNP arranged in the second direction DR2 and a first connection portion CNP1 and a second connection portion CNP2 extending in the second direction DR2 and connected between two main portions MNP neighboring each other.

One power auxiliary line VDAL may overlap two neighboring pixel rows PXC_j and PXC_j+1, PXC_j+2 and PXC_j+3 or PXC_j+4 and PXC_j+5 among the plurality of pixel rows PXCS.

That is, the main portion MNP included in one power auxiliary line VDAL may overlap the boundary between two neighboring pixel rows PXC_j and PXC_j+1, PXC_j+2 and PXC_j+3 or PXC_j+4 and PXC_j+5.

The first connection portion CNP1 may face the boundary between two pixel rows PXC_j and PXC_j+1, PXC_j+2 and PXC_j+3 or PXC_j+4 and PXC_j+5 neighboring each other on one side of the first direction DR1.

The second connection portion CNP2 may face the boundary between two pixel rows PXC_j and PXC_j+1, PXC_j+2 and PXC_j+3 or PXC_j+4 and PXC_j+5 neighboring each other on the other side of the first direction DR1.

The first connection portions CNP1 and the second connection portions CNP2 may be arranged alternately at least one by one in the second direction DR2.

According to an embodiment, each of the mesh auxiliary electrodes MAE disposed between two power auxiliary lines VDAL neighboring each other may be electrically connected to the first connection portion CNP1 of one of the two power auxiliary lines VDAL and may be electrically connected to the second connection portion CNP2 of the other of the two power auxiliary lines VDAL.

For example, among the power auxiliary lines VDAL, a first power auxiliary line VDAL1 may overlap the $j^{th}$ pixel row PXC_j and $(j+1)^{th}$ pixel row PXC_j+1 neighboring each other in the first direction DR1, among the plurality of pixel rows PXCS.

The main portions MNP of the first power auxiliary line VDAL1 may overlap the boundary between the $j^{th}$ pixel row PXC_j and the $(j+1)^{th}$ pixel row PXC_j+1 and may be arranged in the second direction DR2.

As the first connection portion CNP1 of the first power auxiliary line VDAL1 overlaps the $(j+1)^{th}$ pixel row PXC_j+1, it may face the right side of the boundary between the $j^{th}$ pixel row PXC_j and the $(j+1)^{th}$ pixel row PXC_j+1.

As the second connection portion CNP2 of the first power auxiliary line VDAL1 overlaps the $j^{th}$ pixel row PXC_j, it may face the left side of the boundary between the $j^{th}$ pixel row PXC_j and the $(j+1)^{th}$ pixel row PXC_j+1.

Among the power auxiliary lines VDAL, a second power auxiliary line VDAL2 neighboring the first power auxiliary line VDAL1 in the first direction DR1 may overlap the $(j+2)^{th}$ pixel row PXC_j+2 neighboring the $(j+1)^{th}$ pixel row PXC_j, and the $(j+3)^{th}$ pixel row PXC_j+3 neighboring the $(j+2)^{th}$ pixel row PXC_j+2 in the first direction DR1.

The main portions MNP of the second power auxiliary line VDAL2 may overlap the boundary between the $(j+2)^{th}$ pixel row PXC_j+2 and the $(j+3)^{th}$ pixel row PXC_j+3.

The first connection portion CNP1 of the second power auxiliary line VDAL2 may overlap the $(j+3)^{th}$ pixel row PXC_j+3.

The second connection portion CNP2 of the second power auxiliary line VDAL2 may overlap the $(j+2)^{th}$ pixel row PXC_j+2.

Among the power auxiliary lines VDAL, a third power auxiliary line VDAL3 neighboring the second power auxiliary line VDAL2 in the first direction DR1 may overlap the $(j+4)^{th}$ pixel row PXC_j+4 neighboring the $(j+3)^{th}$ pixel row PXC_j+3 and the $(j+5)^{th}$ pixel row PXC_j+5 neighboring the $(j+4)^{th}$ pixel row PXC_j+4 in the first direction DR1.

The main portions MNP of the third power auxiliary line VDAL3 may overlap the boundary between the $(j+4)^{th}$ pixel row PXC_j+4 and the $(j+5)^{th}$ pixel row PXC_j+5.

The first connection portion CNP1 of the third power auxiliary line VDAL3 may overlap the $(j+5)^{th}$ pixel row PXC_j+5.

The second connection portion CNP2 of the third power auxiliary line VDAL3 may overlap the $(j+4)^{th}$ pixel row PXC_j+4.

The first connection portion CNP1 of the first power auxiliary line VDAL1 overlaps the $(j+1)^{th}$ pixel row PXC_j+1, and the second connection portion CNP2 of the second power auxiliary line VDAL2 overlaps the $(j+2)^{th}$ pixel row PXC_j+2, and thus the first connection portion CNP1 of the first power auxiliary line VDAL1 may face the second connection portion CNP2 of the second power auxiliary line VDAL2.

Accordingly, the mesh auxiliary electrodes MAE between the first power auxiliary line VDAL1 and the second power auxiliary line VDAL2 may be electrically connected to the first connection portion CNP1 of the first power auxiliary line VDAL1 and the second connection portion CNP2 of the second power auxiliary line VDAL2.

In addition, the first connection portion CNP1 of the second power auxiliary line VDAL2 may overlap the $(j+3)^{th}$ pixel row PXC_j+3, and the second connection portion CNP2 of the third power auxiliary line VDAL3 may overlap the $(j+4)^{th}$ pixel row PXC_j+4, and thus the first connection portion CNP1 of the second power auxiliary line VDAL2 may face the second connection portion CNP2 of the third power auxiliary line VDAL3.

Accordingly, the mesh auxiliary electrodes MAE between the second power auxiliary line VDAL2 and the third power auxiliary line VDAL3 may be electrically connected to the first connection portion CNP1 of the second power auxiliary line VDAL2 and the second connection portion CNP2 of the third power auxiliary line VDAL3.

In this way, the mesh auxiliary electrodes MAE may be alternately connected to both ends of each of the power auxiliary lines VDAL in a zigzag shape.

The mesh auxiliary electrodes MAE may be electrically connected to the power auxiliary lines VDAL through first power connection holes VDCH1.

According to an embodiment, the circuit layer 120 may further include shielding auxiliary electrodes BAE disposed between the power auxiliary lines VDAL and arranged alternately with the mesh auxiliary electrodes MAE in the first direction DR1 and the second direction DR2.

As shown in FIG. 11, according to an embodiment, each of the light emitting pixel drivers EPD may include a capacitor electrode CAE for providing a pixel capacitor PC1 (see FIG. 5).

The capacitor electrode CAE may be disposed in a second gate conductive layer GCDL2 (see FIG. 13) and may overlap a gate electrode G1 (see FIG. 12) of the first transistor T1 (see FIG. 5).

According to an embodiment, the capacitor electrodes CAE of two light emitting pixel drivers EPD neighboring each other in the first direction DR1 may be in contact with other at the boundary between the two light emitting pixel drivers EPD, and may overlap one of the shielding auxiliary electrodes BAE and the mesh auxiliary electrodes MAE.

In addition, the capacitor electrodes CAE of two other light emitting pixel drivers EPD neighboring each other in the first direction DR1 may be connected to each other through a bypass extension portion BCN extending in the first direction DR1.

One capacitor electrode CAE of the two other light emitting pixel drivers EPD may overlap one of the mesh auxiliary electrodes MAE, while the other capacitor electrode CAE may overlap one of the shielding auxiliary electrodes BAE.

Accordingly, the capacitor electrodes CAE of the light emitting pixel drivers EPD, which are parallel to each other in the first direction DR1, may be connected to each other.

Some of the capacitor electrodes CAE connected in the first direction DR1 may be electrically connected to the mesh auxiliary electrodes MAE of the first power line VDL (see FIG. 12), and others may be electrically connected to the shielding auxiliary electrodes BAE.

In addition, the shielding auxiliary electrodes BAE may be electrically connected to the first power line VDL (see FIG. 12) through the capacitor electrodes CAE.

The mesh auxiliary electrodes MAE may be electrically connected to the capacitor electrode CAE through a second power connection hole VDCH2.

The shielding auxiliary electrodes BAE may be electrically connected to the capacitor electrode CAE through a third power connection hole VDCH3.

In addition, in each of the light emitting pixel drivers EPD, a first electrode portion S5 (see FIG. 12) of the fifth transistor T5 (see FIG. 5) may be electrically connected to one of the mesh auxiliary electrodes MAE and the shielding auxiliary electrodes BAE through a fourth power connection hole VDCH4.

Accordingly, the first electrode portion S5 (see FIG. 12) of the fifth transistor T5 (see FIG. 5) may be electrically connected to the first power line VDL.

As shown in FIG. 10, according to an embodiment, the mesh auxiliary electrodes MAE and the shielding auxiliary electrodes BAE arranged alternately between two power auxiliary lines VDAL neighboring each other may overlap two data lines DL and two second auxiliary lines ASL2 disposed between the two power auxiliary lines VDAL.

In this way, the mesh auxiliary electrodes MAE and the shielding auxiliary electrodes BAE are electrically connected to the first power line VDL, thereby reducing distortion of the data signal Vdata (see FIG. 5) transmitted through the data lines DL and the second bypass auxiliary line BASL2 among the second auxiliary lines ASL2.

Figure 17:
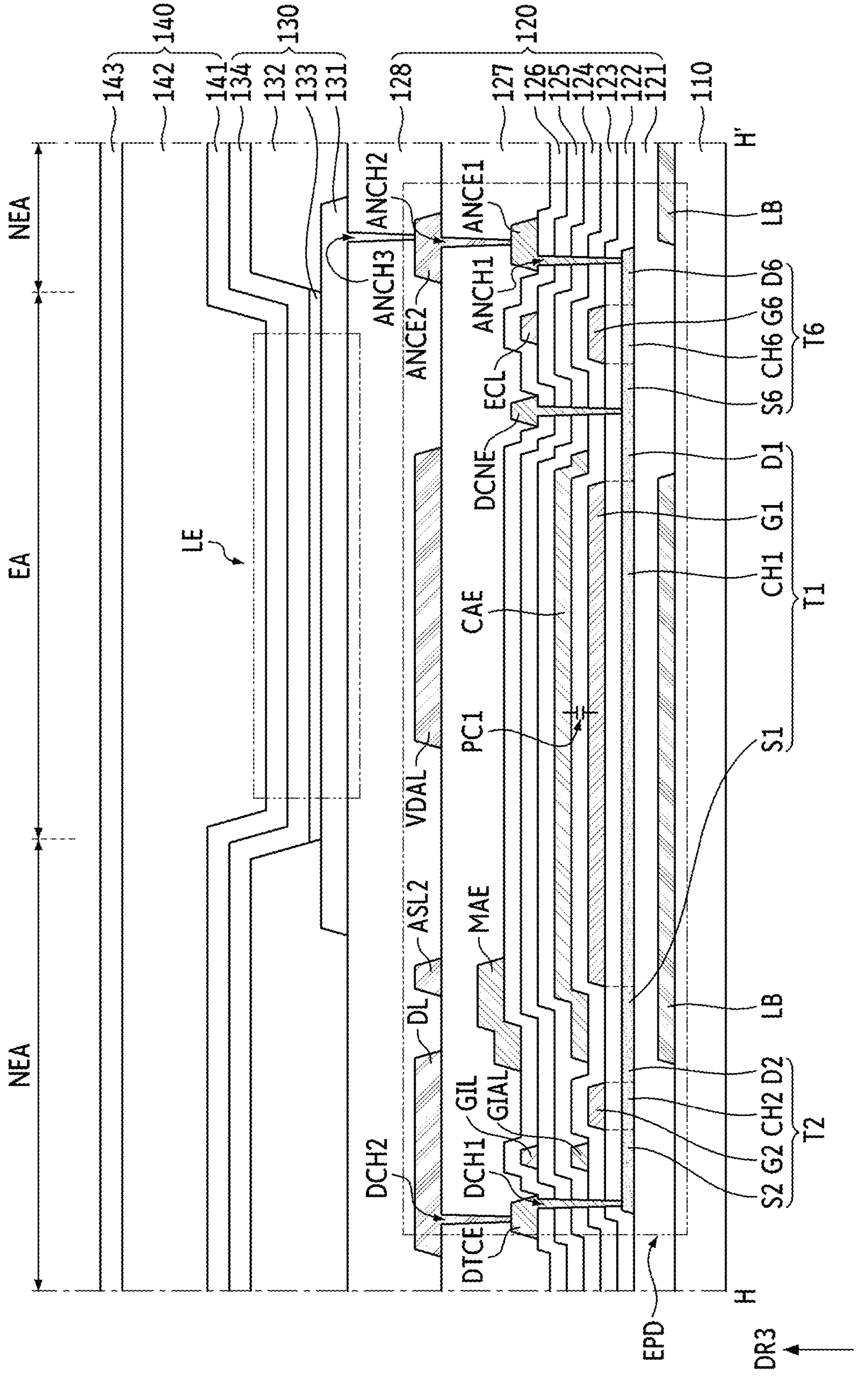
FIG. 17 is a cross-sectional view showing a light emitting element and taken along line H-H' of FIG. 16.
Figure 18:
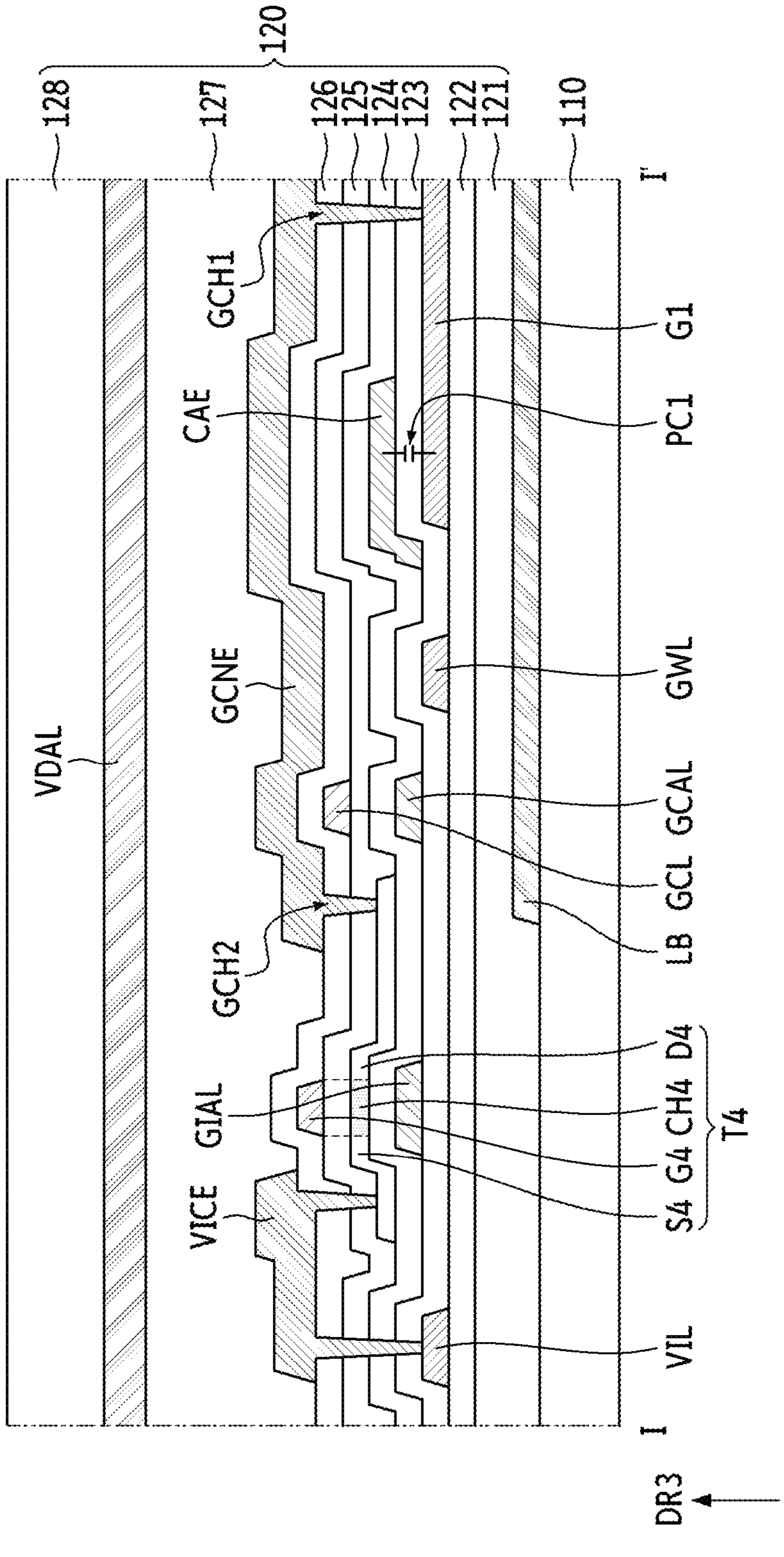
FIG. 18 is a cross-sectional view taken along line I-I' of FIG. 16.

FIGS. 12, 13, 14, 15 and 16 are plan views showing the circuit layer of part G of FIG. 10. FIG. 17 is a cross-sectional view showing a light emitting element and taken along line H-H' of FIG. 16. FIG. 18 is a cross-sectional view taken along line I-I' of FIG. 16.

FIGS. 12, 13, 14, 15, and 16 show two light emitting pixel drivers EPD neighboring each other in the first direction DR1.

First, referring to FIGS. 17 and 18, the circuit layer 120 of the display device 100 according to an embodiment may include the first semiconductor layer SEL1 (see FIG. 12) disposed on the substrate 110, a first gate insulating layer 122 covering the first semiconductor layer SEL1, a first gate conductive layer GCDL1 (see FIG. 12) disposed on the first gate insulating layer 122, a second gate insulating layer 123 covering the first gate conductive layer GCDL1, a second gate conductive layer GCDL2 (see FIG. 13) disposed on the second gate insulating layer 123, a first interlayer insulating layer 124 covering the second gate conductive layer GCDL2, a second semiconductor layer SEL2 (see FIG. 14) disposed on the first interlayer insulating layer 124, a third gate insulating layer 125 covering the second semiconductor layer SEL2, a third gate conductive layer GCDL3 (see FIG. 14) disposed on the third gate insulating layer 125, a second interlayer insulating layer 126 covering the third gate conductive layer GCDL3, a first source-drain conductive layer SDCDL1 (see FIG. 15) disposed on the second interlayer insulating layer 126, a first planarization layer 127 covering the first source-drain conductive layer SDCDL1, a second source-drain conductive layer SDCDL2 (see FIG. 16) disposed on the first planarization layer 127, and a second planarization layer 128 covering the second source-drain conductive layer SDCDL2.

According to an embodiment, the circuit layer 120 may further include a light blocking layer LB disposed on the substrate 110 and a buffer layer 121 covering the light blocking layer LB. In this case, the first semiconductor layer SEL1 may be disposed on the buffer layer 121.

Figure 12:
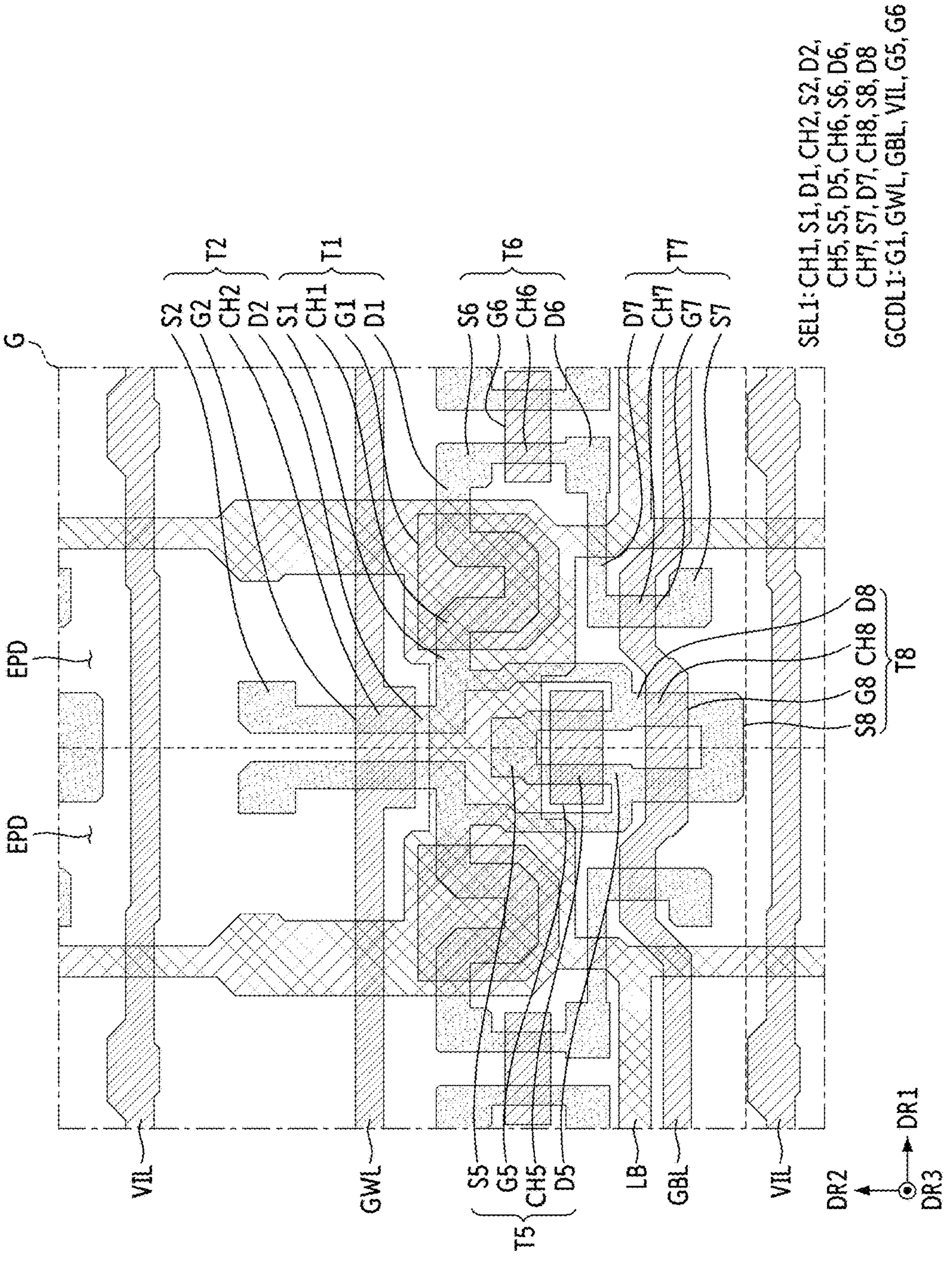
FIGS. 12, 13, 14, 15 and 16 are plan views showing the circuit layer of part G of FIG. 10.

As shown in FIG. 12, the first semiconductor layer SEL1 may include channel portions CH1, CH2, CH5, CH6, CH7, and CH8, first electrode portions S1, S2, S5, S6, S7, and S8, and second electrode portions D1, D2, D5, D6, D7, and D8 of the respective first transistor T1, second transistor T2, fifth transistor T5, sixth transistor T6, seventh transistor T7, and eighth transistor T8 provided as P-type MOSFETs.

The channel portion CH1 of the first transistor T1 may overlap the light blocking layer LB.

The first electrode portion S1 of the first transistor T1 may be connected to the second electrode portion D2 of the second transistor T2, the second electrode portion D5 of the fifth transistor T5, and the second electrode portion D8 of the eighth transistor T8.

The second electrode portion D1 of the first transistor T1 may be connected to the first electrode portion S6 of the sixth transistor T6.

The second electrode portion D6 of the sixth transistor T6 may be connected to the second electrode portion D7 of the seventh transistor T7.

The first gate conductive layer GCDL1 may include the gate electrode G1 of the first transistor T1 overlapping the channel portion CH1 of the first transistor T1.

The first gate conductive layer GCDL1 may include the scan write line GWL, the bias control line GBL, the gate initialization voltage line VIL, a gate electrode G5 of the fifth transistor T5, and a gate electrode G6 of the sixth transistor T6.

The scan write line GWL may extend in the first direction DR1 and may overlap the channel portion CH2 of the second transistor T2.

A portion of the scan write line GWL overlapping the channel portion CH2 of the second transistor T2 may be the gate electrode G2 of the second transistor T2.

The bias control line GBL may extend in the first direction DR1 and may overlap the channel portion CH7 of the seventh transistor T7.

A portion of the bias control line GBL overlapping the channel portion CH7 of the seventh transistor T7 may be the gate electrode G7 of the seventh transistor T7.

The gate initialization voltage line VIL may extend in the first direction DR1.

The gate electrode G5 of the fifth transistor T5 may overlap the channel portion CH5 of the fifth transistor T5.

The gate electrode G6 of the sixth transistor T6 may overlap the channel portion CH6 of the sixth transistor T6.

Figure 13:
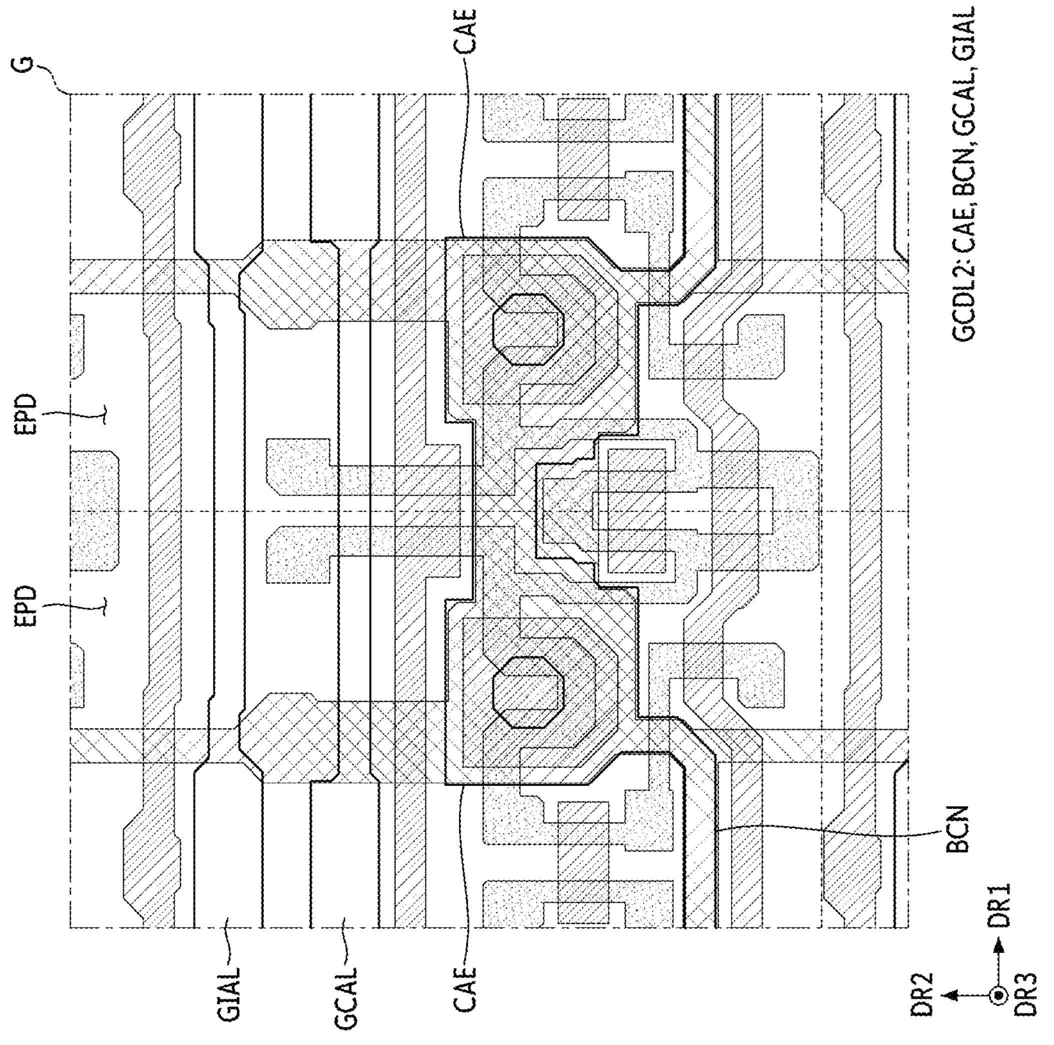

As shown in FIG. 13, the second gate conductive layer GCDL2 may include the capacitor electrode CAE that overlaps the gate electrode G1 of the first transistor T1.

The capacitor electrodes CAE may be arranged side by side in the first direction DR1.

The second gate conductive layer GCDL2 may include the bypass connection portion BCN extending in the first direction DR1 and connecting the capacitor electrodes CAE neighboring each other, and a gate control auxiliary line GCAL transmitting the gate control signal GC (see FIG. 5), and a scan initialization auxiliary line GIAL transmitting the scan initialization signal GI (see FIG. 5).

Each of the gate control auxiliary line GCAL and the scan initialization auxiliary line GIAL may extend in the first direction DR1.

Figure 14:
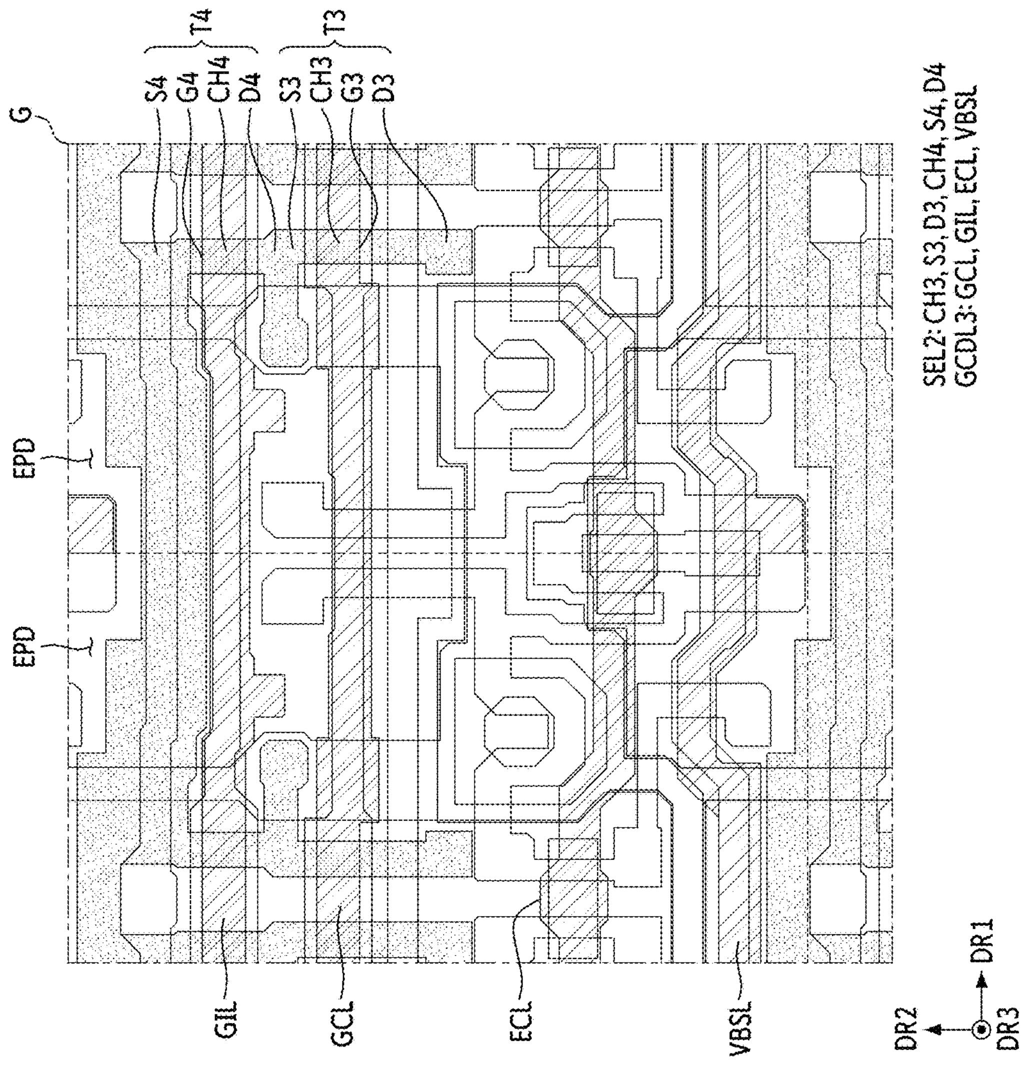

As shown in FIG. 14, the second semiconductor layer SEL2 may include channel portions CH3 and CH4, first electrode portions S3 and S4, and second electrode portions D3 and D4 of the respective third and fourth transistors T3 and T4 provided as N-type MOSFETs.

The channel portion CH3 of the third transistor T3 may intersect the gate control auxiliary line GCAL (see FIG. 13).

The first electrode portion S3 of the third transistor T3 may be disposed adjacent to the second electrode portion D1 (see FIG. 12) of the first transistor T1.

The second electrode portion D3 of the third transistor T3 may be connected to the second electrode portion D4 of the fourth transistor T4.

The channel portion CH4 of the fourth transistor T4 may intersect the scan initialization auxiliary line GIAL (see FIG. 13).

The first electrode portion S4 of the fourth transistor T4 may be disposed adjacent to the gate initialization voltage line VIL (see FIG. 12).

The third gate conductive layer GCDL3 may include the gate control line GCL transmitting the gate control signal GC (see FIG. 5) and overlapping the gate control auxiliary line GCAL (see FIG. 13), the scan initialization line GIL transmitting the scan initialization signal GI (see FIG. 5) and overlapping the scan initialization auxiliary line GIAL (see FIG. 13), the emission control line ECL transmitting the emission control signal EC (see FIG. 5), and the bias voltage line VBSL transmitting the bias voltage VBS (see FIG. 5).

Each of the gate control line GCL, the scan initialization line GIL, the emission control line ECL, and the bias voltage line VBSL may extend in the first direction DR1.

A portion of the gate control line GCL overlapping the channel portion CH3 of the third transistor T3 may be the gate electrode G3 of the third transistor T3.

A portion of the scan initialization line GIL overlapping the channel portion CH4 of the fourth transistor T4 may be the gate electrode G4 of the fourth transistor T4.

The emission control line ECL may intersect the channel portion CH5 (see FIG. 12) of the fifth transistor T5 (see FIG. 12) and the channel portion CH6 (see FIG. 12) of the sixth transistor T6 (see FIG. 12).

The bias voltage line VBSL may be disposed adjacent to the first electrode portion S8 (see FIG. 12) of the eighth transistor T8 (see FIG. 12).

Figure 15:
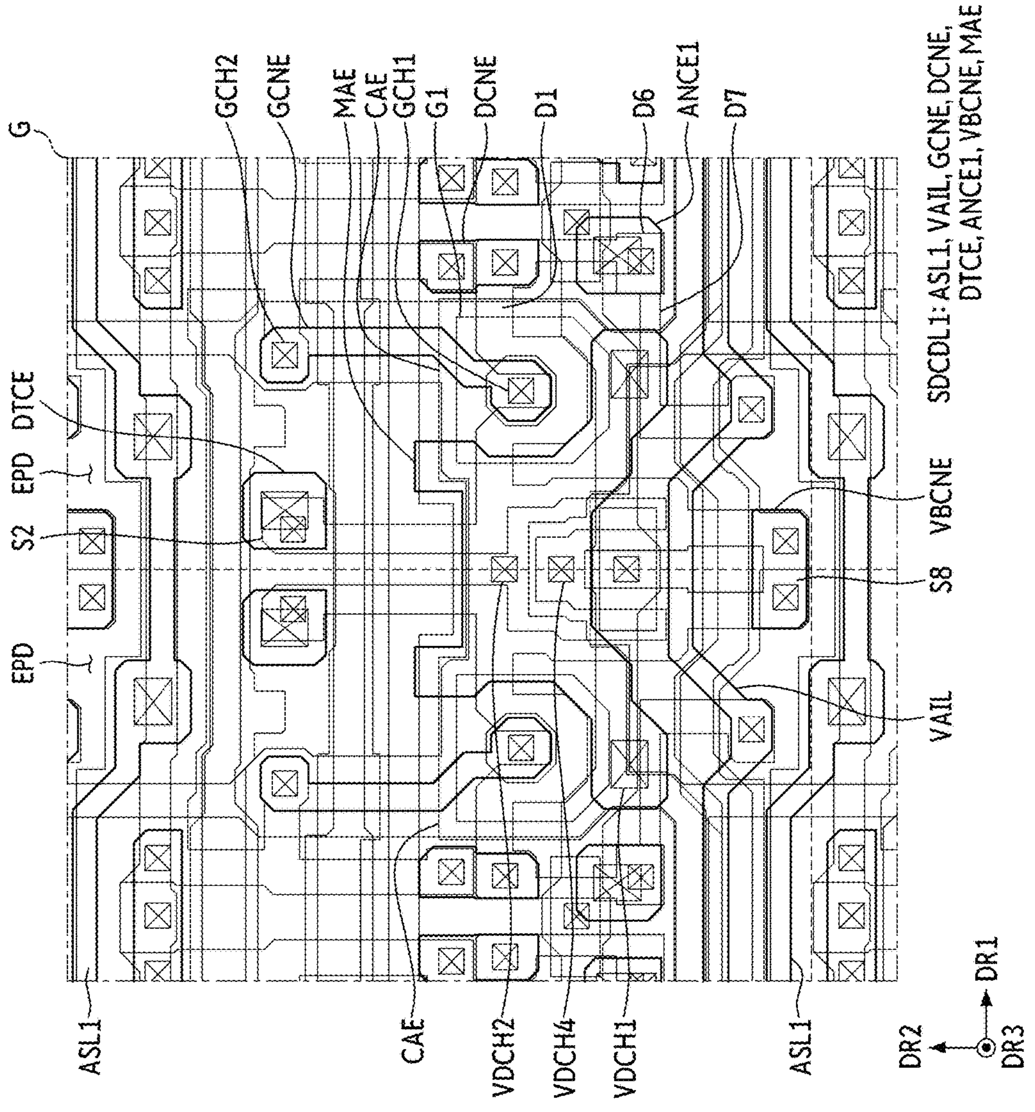

As shown in FIG. 15, the first source-drain conductive layer SDCDL1 may include the first auxiliary line ASL1 extending in the first direction DR1, the mesh auxiliary electrode MAE overlapping the capacitor electrode CAE, and a gate connection electrode GCNE electrically connected to the gate electrode G1 of the first transistor T1.

The mesh auxiliary electrode MAE may overlap the capacitor electrodes CAE of two light emitting pixel drivers EPD neighboring each other in the first direction DR1.

The mesh auxiliary electrode MAE may be electrically connected to the power auxiliary line VDAL (see FIG. 16) through the first power connection hole VDCH1.

The mesh auxiliary electrode MAE may be electrically connected to the capacitor electrode CAE through the second power connection hole VDCH2.

The mesh auxiliary electrode MAE may be electrically connected to the first electrode portion S5 (see FIG. 12) of the fifth transistor T5 (see FIG. 12) through the fourth power connection hole VDCH4.

The gate connection electrode GCNE may electrically connect the gate electrode G1 (see FIG. 14) of the first transistor T1 to a connection point between the second electrode portion D3 (see FIG. 14) of the third transistor T3 (see FIG. 14) and the second electrode portion D4 (see FIG. 14) of the fourth transistor T4 (see FIG. 14) in the second semiconductor layer SEL2 (see FIG. 14).

The gate connection electrode GCNE may be electrically connected to the gate electrode G1 of the first transistor T1 through a first gate connection hole GCH1.

The gate connection electrode GCNE may be electrically connected to the second electrode portion D3 (see FIG. 14) of the third transistor T3 (see FIG. 14) and the second electrode portion D4 (see FIG. 14) of the fourth transistor T4 (see FIG. 14) through a second gate connection hole GCH2.

According to an embodiment, the mesh auxiliary electrode MAE may be disposed in the form of an island that does not extend in the first direction DR1. Accordingly, although the gate connection electrode GCNE disposed in the first source-drain conductive layer SDCDL1 together with the mesh auxiliary electrode MAE extends to overlap the gate electrode G1 of the first transistor T1, it may be spaced apart from the mesh auxiliary electrode MAE. That is, the gate connection electrode GCNE may be directly electrically connected to the gate electrode G1 of the first transistor T1 through the first gate connection hole GCH1.

Therefore, a connection electrode and connection hole for electrical connection between the gate electrode G1 of the first transistor T1 and the gate connection electrode GCNE may be removed. Accordingly, the integration degree of each of the light emitting pixel drivers EPD may be improved, which may be advantageous to increase the resolution of the display device 100.

According to an embodiment, the first source-drain conductive layer SDCDL1 may further include the anode initialization voltage line VAIL transmitting the anode initialization voltage VAINT (see FIG. 5) and extending in the first direction DR1, a drain connection electrode DCNE electrically connected to the second electrode portion D1 of the first transistor T1, a data connection electrode DTCE electrically connected to the first electrode S2 of the second transistor T2, a first anode connection electrode ANCE1 electrically connected to the second electrode portion D6 of the sixth transistor T6, and a bias voltage connection electrode VBCNE electrically connected to the first electrode S8 of the eighth transistor T8.

The anode initialization voltage line VAIL may be electrically connected to the first electrode portion S7 (see FIG. 12) of the seventh transistor T7 (see FIG. 12) through a connection hole.

The drain connection electrode DCNE may be electrically connected to the second electrode portion D1 of the first transistor T1 and the first electrode portion S4 of the fourth transistor T4 (see FIG. 14) through connection holes. That is, the second electrode portion D1 of the first transistor T1 may be electrically connected to the first electrode portion S4 of the fourth transistor T4 (see FIG. 14) through the drain connection electrode DCNE.

The data connection electrode DTCE may be electrically connected to the first electrode portion S2 of the second transistor T2 through a first data connection hole DCH1 (see FIG. 17).

In the first semiconductor layer SEL1 (see FIG. 12), the second electrode portion D6 of the sixth transistor T6 may be connected to the second electrode portion D7 (see FIG. 12) of the seventh transistor T7.

The first anode connection electrode ANCE1 may be electrically connected to a connection point between the second electrode portion D6 of the sixth transistor T6 and the second electrode portion D7 (see FIG. 12) of the seventh transistor T7 in the first semiconductor layer SEL1 (see FIG. 12) through a first anode connection hole ANCH1 (see FIG. 17).

That is, the first anode connection electrode ANCE1 may be electrically connected to the second electrode portion D6 of the sixth transistor T6 and the second electrode portion D7 (see FIG. 12) of the seventh transistor T7 through the first anode connection hole ANCH1 (see FIG. 17).

A bias voltage connection electrode VDCNE may be electrically connected to the first electrode portion S8 of the eighth transistor T8 and the bias voltage line VBSL (see FIG. 14) through connection holes. That is, the first electrode portion S8 of the eighth transistor T8 may be electrically connected to the bias voltage line VBSL (see FIG. 14) through the bias voltage connection electrode VDCNE.

Figure 16:
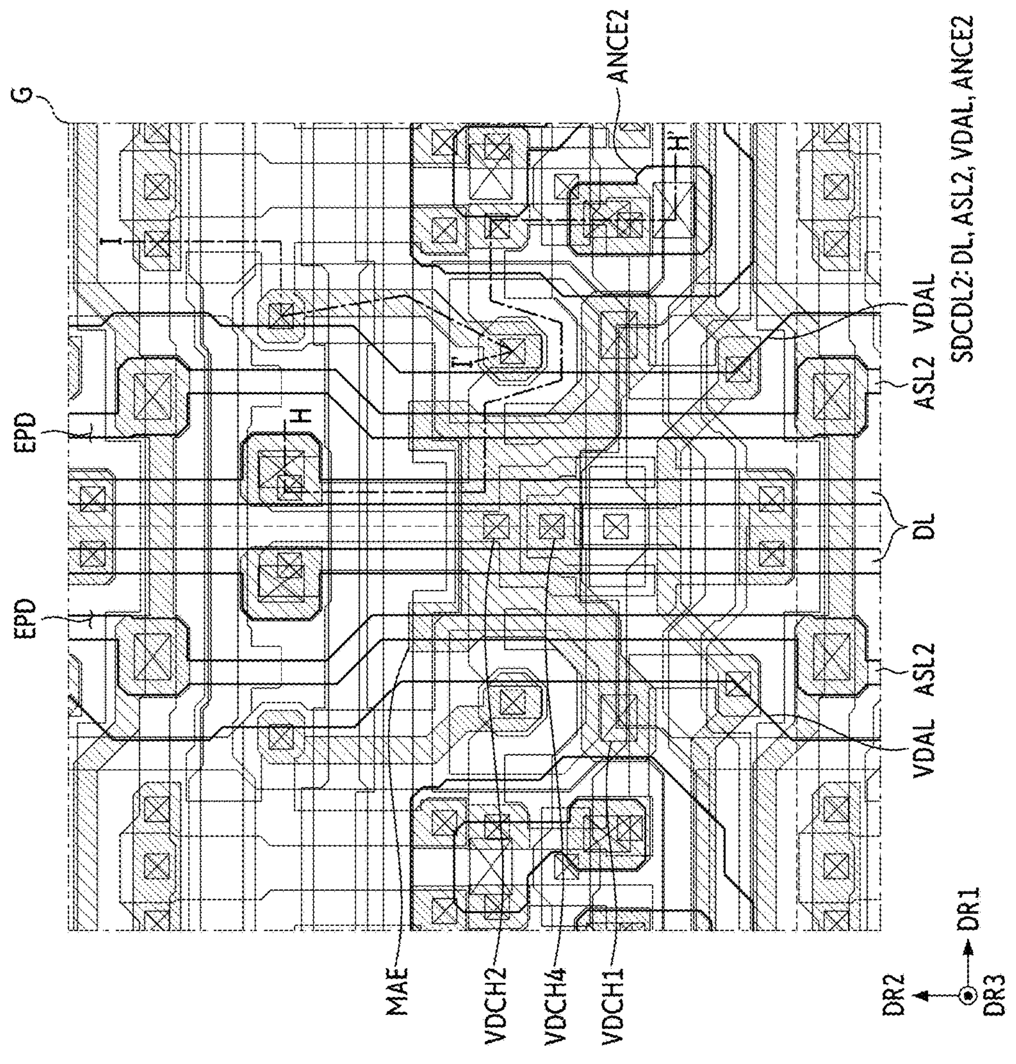

Referring to FIG. 16, the second source-drain conductive layer SDCDL2 may include the data line DL, the second auxiliary line ASL2, and the power auxiliary line VDAL.

Each of the data line DL, the second auxiliary line ASL2, and the power auxiliary line VDAL may extend in the second direction DR2.

The data line DL may be electrically connected to the data connection electrode DTCE (see FIG. 15) through a second data connection hole DCH2 (see FIG. 17).

Accordingly, the first electrode portion S2 (see FIG. 15) of the second transistor T2 may be electrically connected to the data line DL through a data connection electrode DTCE (see FIG. 15).

Each of the second auxiliary lines ASL2 may intersect the first auxiliary lines ASL1 (see FIG. 15) and may be electrically connected to at least one first auxiliary line ASL1 (see FIG. 15) through one of the first bypass connection hole BYCH1 (see FIG. 7), the second bypass connection hole BYCH2 (see FIG. 7) and the transmission auxiliary connection hole TACH.

The power auxiliary line VDAL may overlap two light emitting pixel drivers EPD neighboring each other in the first direction DR1 and may be electrically connected to the mesh auxiliary electrode MAE through the first power connection hole VDCH1 formed on one side of the mesh auxiliary electrode MAE.

As shown in FIG. 17, the display device 100 according to an embodiment may include the substrate 110, the circuit layer 120 on the substrate 110, and the element layer 130 on the circuit layer 120. The display device 100 may further include the encapsulation layer 140 on the element layer 130.

As shown in FIGS. 17 and 18, according to an embodiment, the circuit layer 120 may include the first semiconductor layer SEL1 (CH1, S1, D1, CH2, S2, D2, CH6, S6, and D6, see FIG. 12) disposed on the substrate 110, the first gate insulating layer 122 covering the first semiconductor layer SEL1, the first gate conductive layer GCDL1 (G1, G2, G6, and GWL, see FIG. 12) disposed on the first gate insulating layer 122, the second gate insulating layer 123 covering the first gate conductive layer GCDL1, the second gate conductive layer GCDL2 (CAE, GIAL, and GCAL, see FIG. 13) disposed on the second gate insulating layer 123, the first interlayer insulating layer 124 covering the second gate conductive layer GCDL2, the second semiconductor layer SEL2 (CH4, S4, and D4, see FIG. 14) disposed on the first interlayer insulating layer 124, and the third gate insulating layer 125 covering the second semiconductor layer SEL2. The circuit layer 120 may further include the third gate conductive layer GCDL3 (GIL, ECL, GCL, and G4, see FIG. 14) disposed on the third gate insulating layer 125, the second interlayer insulating layer 126 covering the third gate conductive layer GCDL3, the first source-drain conductive layer SDCDL1 (ANCE1, DTCE, MAE, DCNE, VICE (see FIG. 18), and GCNE, see FIG. 15) disposed on the second interlayer insulating layer 126, the first planarization layer 127 covering the first source-drain conductive layer SDCDL1, the second source-drain conductive layer SDCDL2 (DL, ASL2, VDAL, and ANCE2, see FIG. 16) disposed on the first planarization layer 127, and the second planarization layer 128 covering the second source-drain conductive layer SDCDL2.

According to an embodiment, the circuit layer 120 may further include the light blocking layer LB disposed on the substrate 110 and overlapping the channel portion CH1 of the first transistor T1, and the buffer layer 121 covering the light blocking layer LB. In this case, the first semiconductor layer SEL1 may be disposed on the buffer layer 121.

As previously described with reference to FIG. 5, the circuit layer 120 may include the light emitting pixel drivers EPD electrically connected to the light emitting elements LE disposed in the emission areas EA, respectively, and wires that transmit various signals and voltages to the light emitting pixel drivers EPD. The light emitting pixel drivers EPD may include the first transistor T1 and two or more of the transistors T2 to T8 electrically connected to the first transistor T1.

The first, second, fifth, sixth, seventh, and eighth transistors T1, T2, T5, T6, T7, and T8 may be provided as P-type MOSFETs, and the third and fourth transistors T3 and T4 may be provided as N-type MOSFETs.

As shown in FIG. 17, the first, second, and sixth transistors T1, T2, and T6 provided as a P-type MOSFET may have the channel portions CH1, CH2, and CH6, the first electrode portions S1, S2, and S6, and the second electrode portions D1, D2, and D6 disposed in the first semiconductor layer SEL1, and the gate electrodes G1, G2, G6 overlapping the channel portions CH1, CH2, and CH6, respectively.

The gate electrodes G1, G2, and G6 of the first, second, and sixth transistors T1, T2, and T6 may be disposed in the first gate conductive layer GCDL1.

The first electrode portions S1, S2, and S6 may be respectively connected to one sides of the channel portions CH1, CH2, and CH6, and the second electrode portions D1, D2, and D6 may be respectively connected to the other sides of the channel portions CH1, CH2, and CH6.

The first electrode portions S1, S2, and S6 and the second electrode portions D1, D2, and D6 may be doped at higher concentrations than the channel portions CH1, CH2, and CH6.

According to embodiments, the fifth transistor T5 (see FIG. 5), the seventh transistor T7 (see FIG. 5), and the eighth transistor T8 (see FIG. 5) may be provided as P-type MOSFETs substantially similarly to the first transistor T1, the second transistor T2, and the sixth transistor T6, and thus redundant description will be omitted below.

The first electrode portion S2 of the second transistor T2 may be electrically connected to the data line DL through a data connection electrode DTCE.

The data connection electrode DTCE may be disposed in the first source-drain conductive layer SDCDL1 on the second interlayer insulating layer 126, and may be electrically connected to the first electrode portion S2 of the second transistor T2 through the first data connection hole DCH1. The first data connection hole DCH1 may penetrate the second interlayer insulating layer 126, the third gate insulating layer 125, the first interlayer insulating layer 124, the second gate insulating layer 123, and the first gate insulating layer 122.

The data line DL may be disposed in the second source-drain conductive layer SDCDL2 on the first planarization layer 127, and may be electrically connected to the data connection electrode DTCE through a second data connection hole DCH2 penetrating the first planarization layer 127.

The second electrode portion D2 of the second transistor T2 may be connected to the first electrode portion S1 of the first transistor T1.

The second electrode portion D1 of the first transistor T1 may be connected to the first electrode portion S6 of the sixth transistor T6.

The second electrode portion D6 of the sixth transistor T6 may be electrically connected to an anode electrode 131 through the first anode connection electrode ANCE1 and the second anode connection electrode ANCE2.

The first anode connection electrode ANCE1 may be disposed in the first source-drain conductive layer SDCDL1 on the second interlayer insulating layer 126, and may be electrically connected to the second electrode portion D6 of the six transistor T6 through a first anode contact hole ANCH1.

The first anode contact hole ANCH1 may penetrate the second interlayer insulating layer 126, the third gate insulating layer 125, the first interlayer insulating layer 124, the second gate insulating layer 123, and the first gate insulating layer 122.

The second anode connection electrode ANCE2 may be disposed on the second source-drain conductive layer SDCDL2 on the first planarization layer 127, and electrically connected to the first anode connection electrode ANCE1 through a second anode contact hole ANCH2 penetrating the first planarization layer 127.

The anode electrode 131 may be disposed on the second planarization layer 128, and may be electrically connected to the second anode connection electrode ANCE2 through a third anode contact hole ANCH3 penetrating the second planarization layer 128.

As shown in FIG. 18, the scan write line GWL (see FIG. 5), which is electrically connected to the gate electrode G2 of the second transistor T2, may be disposed on the first gate conductive layer GCDL1 on the first gate insulating layer 122.

As shown in FIGS. 17 and 18, according to an embodiment, the circuit layer 120 may further include the capacitor electrode CAE disposed on the second gate conductive layer GCDL2 on the second gate insulating layer 123 and overlapping the gate electrode G1 of the first transistor T1.

The capacitor electrodes CAE may be connected to each other in the first direction DR1. The capacitor electrode CAE may be electrically connected to the mesh auxiliary electrode MAE (see FIG. 15) of the first power line VDL (see FIG. 10) through the second power connection hole VDCH2 (see FIG. 15), or may be electrically connected to the shielding auxiliary electrode BAE (see FIG. 11) through the third power connection hole VDCH3 (see FIG. 11).

Accordingly, the pixel capacitor PC1 (see FIG. 5) may be provided by the overlapping area between the gate electrode G1 of the first transistor T1 and the capacitor electrode CAE.

According to embodiments, each of the third transistor T3 (see FIG. 5) and the fourth transistor T4 provided as an N-type MOSFET may include the channel portion CH4, the first electrode portion S4, and the second electrode portion D4 disposed in the second semiconductor layer SEL2 on the first interlayer insulating layer 124, and the gate electrode G4 disposed in the third gate conductive layer GCDL3 on the third gate insulating layer 125 and overlapping the channel portion CH4.

The second gate conductive layer GCDL2 on the second gate insulating layer 123 may include the gate control auxiliary line GCAL overlapping the channel portion CH3 (see FIG. 14) of the third transistor T3, and the scan initialization auxiliary line GIAL overlapping the channel portion CH4 of the fourth transistor T4.

The third gate conductive layer GCDL3 may include the gate control line GCL (see FIG. 5) electrically connected to the gate electrode of the third transistor T3 and the scan initialization line GIL (see FIG. 5) electrically connected to the gate electrode G4 of the fourth transistor T4.

According to embodiments, since the third transistor T3 is provided as an N-type MOSFET that is substantially the same as the fourth transistor T4, redundant description will be omitted below.

The first electrode portion S4 of the fourth transistor T4 may be electrically connected to the gate initialization voltage line VIL through an initialization voltage connection electrode VICE.

The initialization voltage connection electrode VICE may be disposed in the first source-drain conductive layer SDCDL1 on the second interlayer insulating layer 126.

The initialization voltage connection electrode VICE may be electrically connected to each of the gate initialization voltage line VIL and the first electrode portion S4 of the fourth transistor T4 through connection holes.

The second electrode portion D4 of the fourth transistor T4 may be connected to the second electrode portion D3 (see FIG. 14) of the third transistor T3, and may be electrically connected to the gate electrode G1 of the first transistor T1 through the gate connection electrode GCNE.

The gate connection electrode GCNE may be disposed in the first source-drain conductive layer SDCDL1 on the second interlayer insulating layer 126.

The gate connection electrode GCNE may be electrically connected to the gate electrode G1 of the first transistor T1 through the first gate connection hole GCH1. In addition, the gate connection electrode GCNE may be electrically connected to the connection point between the second electrode portion D3 (see FIG. 14) of the third transistor T3 and the second electrode portion D4 of the fourth transistor T4 in the second semiconductor layer SEL2 through the second gate connection hole GCH2.

The element layer 130 may be disposed on the circuit layer 120, and may include the light emitting elements LE respectively corresponding to the emission areas EA.

Each of the light emitting elements LE may include the anode electrode 131 and a cathode electrode 134 facing each other, and a light emitting layer 133 disposed therebetween.

That is, the element layer 130 may include the anode electrodes 131 respectively disposed in the emission areas EA, a pixel defining layer 132 disposed in the non-emission area and covering the edge of the anode electrode 131, the light emitting layers 133 respectively disposed on the anode electrodes 131, and the cathode electrode 134 disposed on the light emitting layers 133 and the pixel defining layer 132.

In an embodiment, each of the light emitting elements LE may further include a first common layer disposed between the anode electrode 131 and the light emitting layer 133, and a second common layer disposed between the light emitting layer 133 and the cathode electrode 134.

The anode electrode 131 may be disposed in each of the emission areas EA and may be electrically connected to one light emitting pixel driver EPD of the circuit layer 120. This anode electrode 131 may be referred to as a pixel electrode.

The anode electrode 131 may be electrically connected to the second anode connection electrode ANCE2 through the third anode contact hole ANCH3 penetrating the second planarization layer 128.

The light emitting layer 133 may include an organic light emitting material that converts electron-hole pairs into light.

The cathode electrode 134 may be disposed in the display area DA including the emission areas EA. The voltage of the second power source ELVSS (see FIG. 5) may be commonly applied to the cathode electrode 134. The cathode electrode 134 may be referred to as a common electrode.

The encapsulation layer 140 may be disposed on the circuit layer 120 and cover the element layer 130.

As an example, the encapsulation layer 140 may include a first encapsulation layer 141 disposed on the element layer 130 and made of an inorganic insulating material, a second encapsulation layer 142 disposed on the first encapsulation layer 141, overlapping the element layer 130, and made of an organic insulating material, and a third encapsulation layer 143 covering the second encapsulation layer 142 and made of an inorganic insulating material.

The display device according to one embodiment of the present disclosure can be applied to various electronic devices. The electronic device according to the one embodiment of the present disclosure includes the display device described above, and may further include modules or devices having additional functions in addition to the display device.

Figure 19:
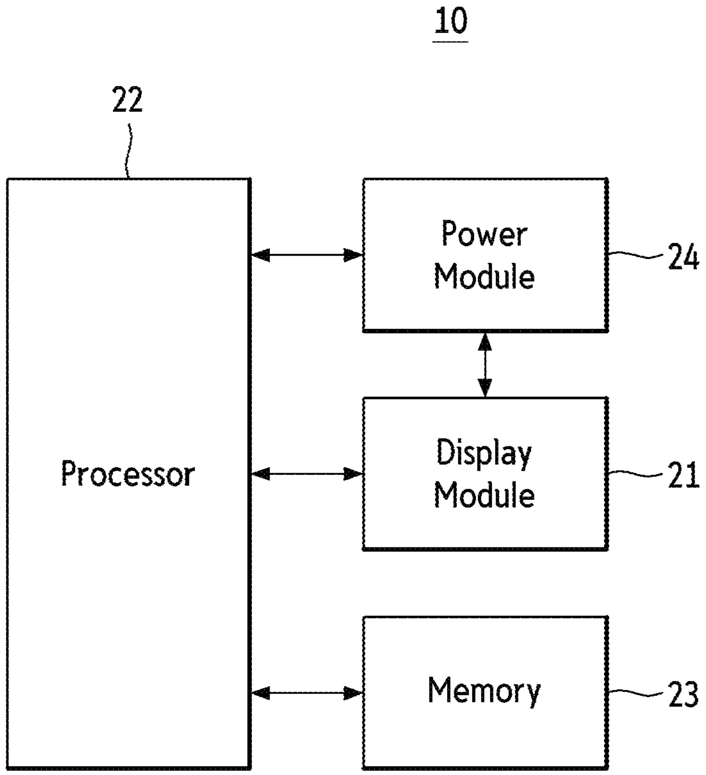
FIG. 19 is a block diagram of an electronic device according to an embodiment of the present disclosure.

FIG. 19 is a block diagram of an electronic device 10 according to an embodiment of the present disclosure.

Referring to FIG. 19, the electronic device 10 according to one embodiment of the present disclosure may include a display module 21, a processor 22, a memory 23, and a power module 24.

The processor 22 may include at least one of a central processing unit (CPU), an application processor (AP), a graphic processing unit (GPU), a communication processor (CP), an image signal processor (ISP), and a controller.

The memory 23 may store data information necessary for the operation of the processor 22 or the display module 21. When the processor 22 executes an application stored in the memory 23, an image data signal and/or an input control signal is transmitted to the display module 21, and the display module 21 can process the received signal and output image information through a display screen.

The power module 24 may include a power supply module such as, for example a power adapter or a battery, and a power conversion module that converts the power supplied by the power supply module to generate power necessary for the operation of the electronic device 10.

At least one of the components of the electronic device 10 according to the one embodiment of the present disclosure may be included in the display device 100 according to the embodiments of the present disclosure. In addition, some modules of the individual modules functionally included in one module may be included in the display device 100, and other modules may be provided separately from the display device 100. For example, the display device 100 may include the display module 21, and the processor 22, the memory 23, and the power module 24 may be provided in the form of other devices within the electronic device 10 other than the display device 100.

Figure 20:
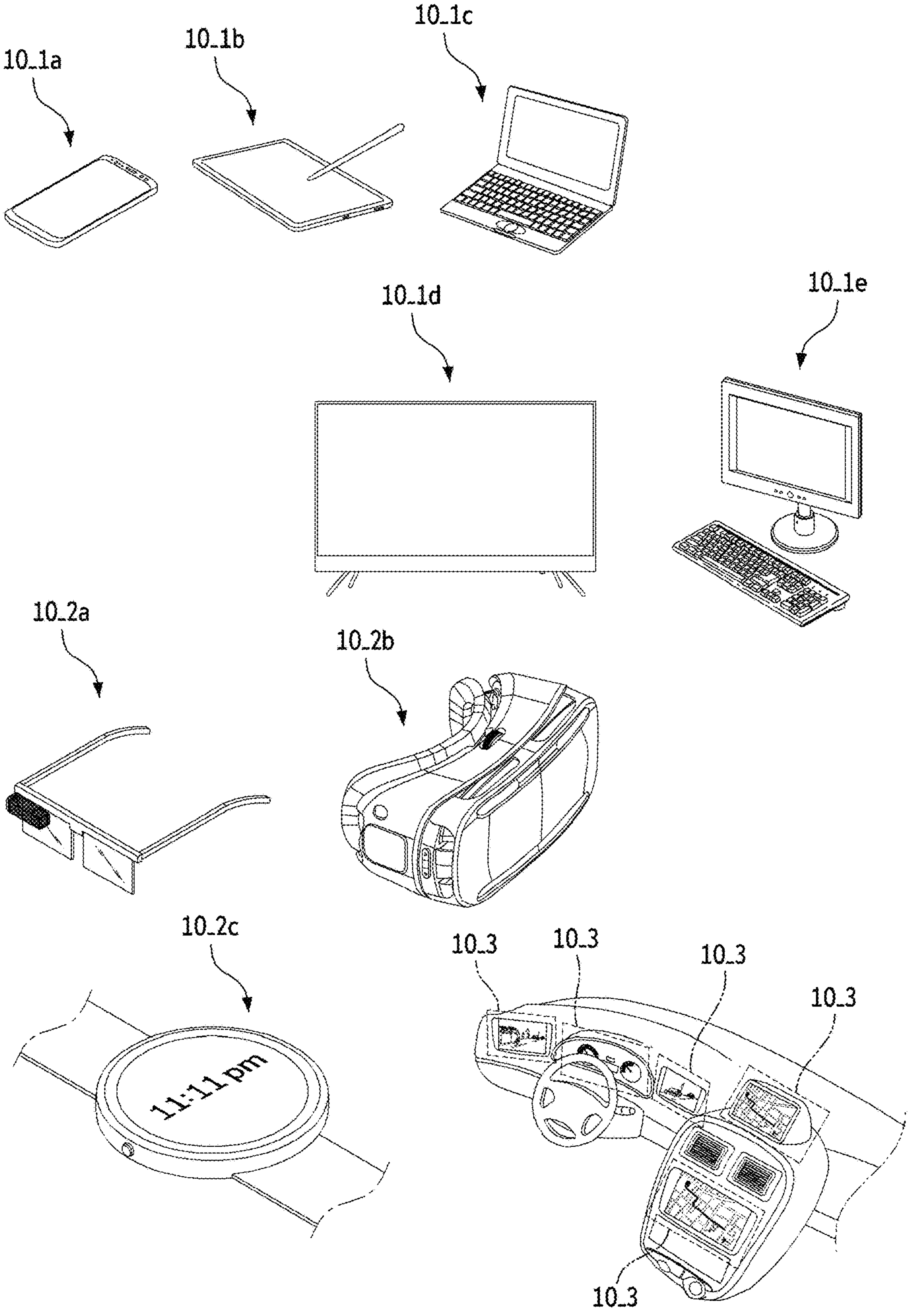
FIG. 20 is a schematic diagram of an electronic device according to various embodiments of the present disclosure.

FIG. 20 is a schematic diagram of an electronic device according to various embodiments of the present disclosure.

Referring to FIG. 20, various electronic devices to which display devices 100 according to embodiments of the present disclosure are applied may include not only image display electronic devices such as a smart phone 10_1*a*, a tablet PC (personal computer) 10_1*b*, a laptop 10_1*c*, a TV 10_1*d*, and a desk monitor 10_1*e*, but also wearable electronic devices including display modules such as, for example smart glasses 10_2*a*, a head mounted display 10_2*b*, and a smart watch 10_2*c*, and vehicle electronic devices 10_3 including display modules such as a CID (Center Information Display) and a room mirror display arranged on a dashboard, center fascia, and dashboard of an automobile.

However, the effects of the present disclosure are not restricted to the one set forth herein. The above and other effects of the present disclosure will become more apparent to one of daily skill in the art to which the present disclosure pertains by referencing the claims.

What is claimed is:

1. A display device comprising:

a substrate comprising a display area in which emission areas are arranged;

a circuit layer disposed on the substrate; and an element layer disposed on the circuit layer and comprising light emitting elements disposed in the emission areas, wherein the circuit layer comprises:

light emitting pixel drivers electrically connected to the light emitting elements and arranged in a plurality of pixel columns and a plurality of pixel rows; and a first power line transmitting a first power to the light emitting pixel drivers, wherein the first power line comprises:

power auxiliary lines extending in one direction; and mesh auxiliary electrodes electrically connected to the power auxiliary lines, wherein among the power auxiliary lines, two power auxiliary lines neighboring each other are electrically connected to each other through mesh auxiliary electrodes disposed between the two power auxiliary lines and parallel to each other in the one direction, among the mesh auxiliary electrodes.

2. The display device of claim 1, wherein each of the plurality of pixel columns comprises light emitting pixel drivers arranged in a first direction, each of the plurality of pixel rows comprises light emitting pixel drivers arranged in a second direction, the one direction being the second direction, the power auxiliary lines extend in the second direction, one of the power auxiliary lines comprises:

main portions overlapping a boundary between two pixel rows neighboring each other in the first direction among the plurality of pixel rows and arranged in the second direction;

a first connection portion facing the boundary between the two pixel rows on one side of the first direction, extending in the second direction, and connected between two neighboring main portions among the main portions; and a second connection portion facing the boundary between the two pixel rows on an other side of the first direction, extending in the second direction, and connected between two other neighboring main portions among the main portions, wherein the first connection portions and the second connection portions are arranged alternately at least one by one in the second direction.

3. The display device of claim 2, wherein the power auxiliary lines comprise a first power auxiliary line, a second power auxiliary line, and a third power auxiliary line neighboring each other in the first direction, a first connection portion of the first power auxiliary line faces a second connection portion of the second power auxiliary line, and a first connection portion of the second power auxiliary line faces a second connection portion of the third power auxiliary line.

4. The display device of claim 2, wherein each of the mesh auxiliary electrodes disposed between the two power auxiliary lines is electrically connected to a first connection portion of one of the two power auxiliary lines, and is electrically connected to a second connection portion of an other of the two power auxiliary lines.

5. The display device of claim 2, wherein one of the light emitting pixel drivers comprises:

a first transistor electrically connected between a first node and a second node;

a pixel capacitor electrically connected between the first power line and a third node;

a second transistor electrically connected between a data line transmitting a data signal and the first node;

a third transistor electrically connected between the second node and the third node;

a fourth transistor electrically connected between a gate initialization voltage line transmitting a gate initialization voltage and the third node;

a fifth transistor electrically connected between the first power line and the first node;

a sixth transistor electrically connected between the second node and a fourth node;

a seventh transistor electrically connected between an anode initialization voltage line transmitting an anode initialization voltage and the fourth node; and an eighth transistor electrically connected between a bias voltage line transmitting a bias voltage and the first node, wherein the first node is electrically connected to a first electrode of the first transistor, the second node is electrically connected to a second electrode of the first transistor, the third node is electrically connected to a gate electrode of the first transistor, and the fourth node is electrically connected to one of the light emitting elements.

6. The display device of claim 5, wherein the circuit layer comprises:

a first semiconductor layer disposed on the substrate;

a first gate insulating layer covering the first semiconductor layer;

a first gate conductive layer disposed on the first gate insulating layer;

a second gate insulating layer covering the first gate conductive layer;

a second gate conductive layer disposed on the second gate insulating layer;

a first interlayer insulating layer covering the second gate conductive layer;

a second semiconductor layer disposed on the first interlayer insulating layer;

a third gate insulating layer covering the second semiconductor layer;

a third gate conductive layer disposed on the third gate insulating layer;

a second interlayer insulating layer covering the third gate conductive layer;

a first source-drain conductive layer disposed on the second interlayer insulating layer;

a first planarization layer covering the first source-drain conductive layer;

a second source-drain conductive layer disposed on the first planarization layer; and a second planarization layer covering the second source-drain conductive layer, wherein the first semiconductor layer comprises a channel portion, a first electrode portion, and a second electrode portion of each of the first transistor, the second transistor, the fifth transistor, the sixth transistor, the seventh transistor, and the eighth transistor, the first gate conductive layer comprises the gate electrode of the first transistor, and the second semiconductor layer comprises a channel portion, a first electrode portion, and a second electrode portion of each of the third transistor and the fourth transistor.

7. The display device of claim 6, wherein the circuit layer further comprises shielding auxiliary electrodes disposed between the power auxiliary lines and arranged alternately with the mesh auxiliary electrodes in the first direction and the second direction, each of the light emitting pixel drivers further comprises a capacitor electrode disposed in the second gate conductive layer and overlapping the gate electrode of the first transistor, and in each of the light emitting pixel drivers, each of the capacitor electrode and the first electrode portion of the fifth transistor is electrically connected to one of the mesh auxiliary electrodes and the shielding auxiliary electrodes.

8. The display device of claim 7, wherein the substrate further comprises a non-display area disposed around the display area, and the circuit layer further comprises:

data lines extending in the second direction and transmitting a data signal to the light emitting pixel drivers;

data supply lines disposed in the non-display area and electrically connected between a display driving circuit supplying the data signal and the data lines;

first auxiliary lines extending in the first direction; and second auxiliary lines extending in the second direction and neighboring the data lines, respectively, wherein a bypass area on one side of the display area comprises a bypass middle area, a first bypass side area parallel to the bypass middle area in the first direction and in contact with the non-display area, and a second bypass side area disposed between the bypass middle area and the first bypass side area, the first auxiliary lines comprise a first bypass auxiliary line electrically connected to a first data line adjacent to the non-display area in the first direction among the data lines, and first transmission auxiliary lines other than the first bypass auxiliary line, the second auxiliary lines comprise a second bypass auxiliary line electrically connected to the first bypass auxiliary line and neighboring a second data line spaced further apart from the non-display area in the first direction than the first data line among the data lines, and second transmission auxiliary lines other than the second bypass auxiliary line, the data supply lines extend to the bypass middle area and the second bypass side area, among the data supply lines, a first data supply line transmitting a data signal of the first data line is electrically connected to the first data line through the first bypass auxiliary line and the second bypass auxiliary line, and among the data supply lines, a second data supply line transmitting a data signal of the second data line is directly electrically connected to the second data line.

9. The display device of claim 8, wherein among the second auxiliary lines, two second auxiliary lines are disposed between the two power auxiliary lines, among the data lines, two data lines are disposed between the two second auxiliary lines, and the mesh auxiliary electrodes and the shielding auxiliary electrodes arranged alternately between the two power auxiliary lines overlap the two data lines and the two second auxiliary lines.

10. The display device of claim 7, wherein capacitor electrodes of two light emitting pixel drivers neighboring each other in the first direction among the light emitting pixel drivers are in contact with each other at a boundary between the two light emitting pixel drivers and overlap one of the mesh auxiliary electrodes and the shielding auxiliary electrodes, capacitor electrodes of two other light emitting pixel drivers neighboring each other in the first direction among the light emitting pixel drivers are connected to each other through a bypass extension portion extending in the first direction, the capacitor electrode of one of the two other light emitting pixel drivers overlaps one of the mesh auxiliary electrodes, and the capacitor electrode of an other of the two other light emitting pixel drivers overlaps one of the shielding auxiliary electrodes.

11. The display device of claim 7, wherein the second source-drain conductive layer comprises the power auxiliary lines, and the first source-drain conductive layer comprises the mesh auxiliary electrodes and the shielding auxiliary electrodes, the mesh auxiliary electrodes are electrically connected to the power auxiliary lines through first power connection holes and are electrically connected to the capacitor electrode through a second power connection hole, the shielding auxiliary electrodes are electrically connected to the capacitor electrode through a third power connection hole, and the first electrode portion of the fifth transistor is electrically connected to one of the mesh auxiliary electrodes and the shielding auxiliary electrodes through a fourth power connection hole.

12. The display device of claim 7, wherein each of the light emitting pixel drivers further comprises a gate connection electrode electrically connecting the gate electrode of the first transistor to a connection point between the second electrode portion of the third transistor and the second electrode portion of the fourth transistor in the second semiconductor layer, and the gate connection electrodes of the light emitting pixel drivers are disposed in the first source-drain conductive layer and are spaced apart from the mesh auxiliary electrodes and the shielding auxiliary electrodes.

13. The display device of claim 12, wherein the gate connection electrode is electrically connected to the gate electrode of the first transistor through a first gate connection hole penetrating the second interlayer insulating layer, the third gate insulating layer, the first interlayer insulating layer, and the second gate insulating layer, and the gate connection electrode is electrically connected to the second electrode portion of the third transistor and the second electrode portion of the fourth transistor through a second gate connection hole penetrating the second interlayer insulating layer and the third gate insulating layer.

14. An electronic device comprising:

a display device displaying an image;

a memory storing an application;

a processor executing the application and transmitting an image data signal and an input control signal to the display device; and a power supply module supplying power to the display device, wherein the display device comprises:

a substrate comprising a display area in which emission areas are arranged;

a circuit layer disposed on the substrate; and an element layer disposed on the circuit layer and comprising light emitting elements disposed in the emission areas, wherein the circuit layer comprises:

light emitting pixel drivers electrically connected to the light emitting elements and arranged in a plurality of pixel columns and a plurality of pixel rows;

data lines transmitting a data signal to the light emitting pixel drivers; and a first power line transmitting a first power to the light emitting pixel drivers, wherein each of the light emitting pixel drivers comprises:

a first transistor electrically connected between a first node and a second node;

a second transistor electrically connected between one of the data lines and the first node;

a third transistor electrically connected between the second node and a third node; and a fourth transistor electrically connected between a gate initialization voltage line transmitting a gate initialization voltage and the third node, wherein the first node is electrically connected to a first electrode of the first transistor, the second node is electrically connected to a second electrode of the first transistor, and the third node is electrically connected to a gate electrode of the first transistor, the first power line comprises:

power auxiliary lines disposed in a same layer as the data lines and extending in one direction; and mesh auxiliary electrodes electrically connected to the power auxiliary lines, each of the light emitting pixel drivers further comprises a gate connection electrode electrically connecting the gate electrode of the first transistor to a connection portion between a second electrode portion of the third transistor and a second electrode portion of the fourth transistor in a second semiconductor layer, the gate connection electrodes of the light emitting pixel drivers are disposed in a same layer as the mesh auxiliary electrodes and are spaced apart from the mesh auxiliary electrodes, and among the power auxiliary lines, two power auxiliary lines neighboring each other are electrically connected to each other through mesh auxiliary electrodes disposed between the two power auxiliary lines and parallel to each other in the one direction, among the mesh auxiliary electrodes.

15. The electronic device of claim 14, wherein each of the light emitting pixel drivers further comprises:

a pixel capacitor electrically connected between the first power line and the third node;

a fifth transistor electrically connected between the first power line and the first node;

a sixth transistor electrically connected between the second node and a fourth node;

a seventh transistor electrically connected between an anode initialization voltage line transmitting an anode initialization voltage and the fourth node; and an eighth transistor electrically connected between a bias voltage line transmitting a bias voltage and the first node, the fourth node is electrically connected to one of the light emitting elements, the circuit layer comprises:

a first semiconductor layer disposed on the substrate;

a first gate insulating layer covering the first semiconductor layer;

a first gate conductive layer disposed on the first gate insulating layer;

a second gate insulating layer covering the first gate conductive layer;

a second gate conductive layer disposed on the second gate insulating layer;

a first interlayer insulating layer covering the second gate conductive layer;

the second semiconductor layer disposed on the first interlayer insulating layer;

a third gate insulating layer covering the second semiconductor layer;

a third gate conductive layer disposed on the third gate insulating layer;

a second interlayer insulating layer covering the third gate conductive layer;

a first source-drain conductive layer disposed on the second interlayer insulating layer;

a first planarization layer covering the first source-drain conductive layer;

a second source-drain conductive layer disposed on the first planarization layer; and a second planarization layer covering the second source-drain conductive layer, wherein the first semiconductor layer comprises a channel portion, a first electrode portion, and a second electrode portion of each of the first transistor, the second transistor, the fifth transistor, the sixth transistor, the seventh transistor, and the eighth transistor, the first gate conductive layer comprises the gate electrode of the first transistor, the second semiconductor layer comprises a channel portion, a first electrode portion, and the second electrode portion of each of the third transistor and the fourth transistor, the first source-drain conductive layer comprises the mesh auxiliary electrodes and the gate connection electrode, and the second source-drain conductive layer comprises the power auxiliary lines.

16. The electronic device of claim 15, wherein each of the plurality of pixel columns comprises light emitting pixel drivers arranged in a first direction, each of the plurality of pixel rows comprises light emitting pixel drivers arranged in a second direction, the one direction being the second direction, the power auxiliary lines extend in the second direction, one of the power auxiliary lines comprises:

main portions overlapping a boundary between two pixel rows neighboring each other in the first direction among the plurality of pixel rows and arranged in the second direction;

a first connection portion facing the boundary between the two pixel rows on one side of the first direction, extending in the second direction, and connected between two neighboring main portions among the main portions; and a second connection portion facing the boundary between the two pixel rows on an other side of the first direction, extending in the second direction, and connected between two other neighboring main portions among the main portions, wherein the first connection portions and the second connection portions are arranged alternately at least one by one in the second direction, each of the mesh auxiliary electrodes disposed between the two power auxiliary lines is electrically connected to a first connection portion of one of the two power auxiliary lines, and is electrically connected to a second connection portion of an other of the two power auxiliary lines.

17. The electronic device of claim 16, wherein the power auxiliary lines comprise a first power auxiliary line, a second power auxiliary line, and a third power auxiliary line neighboring each other in the first direction, a first connection portion of the first power auxiliary line faces a second connection portion of the second power auxiliary line, and a first connection portion of the second power auxiliary line faces a second connection portion of the third power auxiliary line.

18. The electronic device of claim 16, wherein the circuit layer further comprises shielding auxiliary electrodes disposed between the power auxiliary lines and arranged alternately with the mesh auxiliary electrodes in the first direction and the second direction, each of the light emitting pixel drivers further comprises a capacitor electrode disposed in the second gate conductive layer, overlapping the gate electrode of the first transistor, and electrically connected to the first power line, and in each of the light emitting pixel drivers, the first electrode portion of the fifth transistor is electrically connected to the capacitor electrode through one of the mesh auxiliary electrodes and the shielding auxiliary electrodes.

19. The electronic device of claim 18, wherein the display device further comprises a display driving circuit supplying a data signal to the data lines, wherein the substrate further comprises a non-display area disposed around the display area, and the circuit layer further comprises:

data supply lines disposed in the non-display area and electrically connected between the data lines and the display driving circuit;

first auxiliary lines extending in the first direction; and second auxiliary lines extending in the second direction and neighboring the data lines, respectively, wherein a bypass area on one side of the display area comprises a bypass middle area, a first bypass side area parallel to the bypass middle area in the first direction and in contact with the non-display area, and a second bypass side area disposed between the bypass middle area and the first bypass side area, the first auxiliary lines comprise a first bypass auxiliary line electrically connected to a first data line adjacent to the non-display area in the first direction among the data lines, and first transmission auxiliary lines other than the first bypass auxiliary line, the second auxiliary lines comprise a second bypass auxiliary line electrically connected to the first bypass auxiliary line and neighboring a second data line spaced further apart from the non-display area in the first direction than the first data line among the data lines, and second transmission auxiliary lines other than the second bypass auxiliary line, the data supply lines extend to the bypass middle area and the second bypass side area, among the data supply lines, a first data supply line transmitting a data signal of the first data line is electrically connected to the first data line through the first bypass auxiliary line and the second bypass auxiliary line, and among the data supply lines, a second data supply line transmitting a data signal of the second data line is directly electrically connected to the second data line.

20. The electronic device of claim 19, wherein among the second auxiliary lines, two second auxiliary lines are disposed between the two power auxiliary lines, among the data lines, two data lines are disposed between the two second auxiliary lines, and among the shielding auxiliary electrodes, shielding auxiliary electrodes disposed between the two power auxiliary lines overlap the two data lines and the two second auxiliary lines.

* * * * *